US008925494B2

(12) United States Patent
Pang et al.

(10) Patent No.: US 8,925,494 B2
(45) Date of Patent: Jan. 6, 2015

(54) EDIBLE ANIMAL CHEW AND METHOD OF USING THE SAME

(75) Inventors: David Pang, Honolulu, HI (US); Jing Zhang, Shanghai (CN)

(73) Assignee: Ilio Products, Inc

( * ) Notice: Subject to any disclaimer, the term of this patent is extended or adjusted under 35 U.S.C. 154(b) by 373 days.

(21) Appl. No.: 13/550,397

(22) Filed: Jul. 16, 2012

(65) Prior Publication Data
US 2012/0279460 A1  Nov. 8, 2012

Related U.S. Application Data

(63) Continuation-in-part of application No. 29/388,712, filed on Mar. 31, 2011, now Pat. No. Des. 684,746.

(51) Int. Cl.
| A01K 29/00 | (2006.01) |
| A01K 15/02 | (2006.01) |
| A01K 11/00 | (2006.01) |

(52) U.S. Cl.
CPC .................... *A01K 15/026* (2013.01)
USPC .......................... 119/709; 119/710

(58) Field of Classification Search
CPC ..................... A01K 15/026; A01K 15/025
USPC .................................. 119/709, 710
See application file for complete search history.

(56) References Cited

U.S. PATENT DOCUMENTS

| 4,513,014 | A | 4/1985 | Edwards |
| 4,557,219 | A * | 12/1985 | Edwards ........................ 425/472 |
| 4,738,001 | A | 4/1988 | Shipp |
| 5,033,410 | A | 7/1991 | Sigurdsson |
| D473,348 | S | 4/2003 | Lang |
| D499,226 | S | 12/2004 | Axelrod |
| D531,383 | S | 11/2006 | Dettmer et al. |
| 7,490,579 | B2 * | 2/2009 | Axelrod ........................ 119/707 |
| 2006/0102099 | A1 | 5/2006 | Edwards |
| 2006/0107905 | A1 | 5/2006 | Axelrod |
| 2007/0101946 | A1 | 5/2007 | Penny |
| 2008/0041320 | A1 | 2/2008 | Torney et al. |
| 2012/0160180 | A1 * | 6/2012 | Townsend et al. ............ 119/709 |
| 2012/0204809 | A1 * | 8/2012 | Axelrod et al. ................ 119/709 |
| 2012/0272922 | A1 * | 11/2012 | Axelrod et al. ................ 119/709 |
| 2013/0273125 | A1 * | 10/2013 | Barnvos et al. ............... 424/401 |
| 2013/0305999 | A1 * | 11/2013 | Axelrod ........................ 119/710 |

* cited by examiner

*Primary Examiner* — Son T Nguyen
(74) *Attorney, Agent, or Firm* — Jerry R. Potts

(57) ABSTRACT

Edible animal chew and method of using the animal chew. The animal chew is edible and is configured to clean laniaries and gum tissue of an animal as the animal chews and eats the animal chew. The animal chew comprises all-natural ingredients and is, therefore, free of synthetic ingredients and unhealthy added ingredients, such as added sugars. The animal chew may further contain all-natural vitamins for improving health of the animal. A plurality of first projections and second projections on a proximal end portion and a distal end portion, respectively, are provided to clean laniaries and gum tissue for reducing risk of tooth decay and periodontal disease. A plurality of raised nodules is also provided on the distal end portion for massaging gum tissue to reduce risk of periodontal disease.

20 Claims, 14 Drawing Sheets

EDIBLE ANIMAL CHEW AND METHOD OF USING THE SAME

CROSS-REFERENCE TO RELATED APPLICATION

This application is a continuation-in-part of U.S. patent application Ser. No. 29/388,712, filed Mar. 31, 2011 now U.S. Pat. No. Des. 684,746 titled "Edible Dog chew" in the name of David Pang, et al.

FIELD OF THE INVENTION

This invention generally relates to animal husbandry and more particularly relates to an edible animal chew for cleaning laniaries and gum tissue of an animal and a method of using the same.

BACKGROUND OF THE INVENTION

Omnivorous and carnivorous animals, such as dogs, eat foods having constituents that, over time, may cause tooth decay and periodontal disease unless steps are taken to prevent the tooth decay and periodontal disease. In this regard, tooth decay is caused by a thin layer of food debris, dead cells and proteins from saliva that form plaque on the teeth and gum tissue of the animal. The plaque, which causes the tooth decay, hardens to form a calculus unless removed. Periodontal disease, which is also referred to as gingivitis or gum disease, can be caused by bacteria located between the teeth and gum tissue (i.e., gingival pocket) of the animal. Presence of these bacteria also leads to formation of plaque that, in turn, can cause periodontal disease.

More specifically, tooth decay in animals occurs when food debris containing carbohydrates (i.e., sugars and starches) are left on the teeth. Bacteria normally present in the animal's mouth digest the food debris and transform the food debris into acids. The bacteria, acid, food debris and saliva combine to form plaque that, in turn, clings to the teeth. The acids in the plaque dissolve tooth enamel and create holes in the teeth to form cavities or caries.

In the case of periodontal disease, the animal's gum tissue becomes swollen and inflamed due to infection. Swelling and inflammation of the gum tissue causes the edge of the gum tissue to no longer lay flat against the tooth. Thus, a space is created between the edge of the gum tissue and tooth when the edge of the gum tissue no longer lays flat against the tooth. Bacteria locate in this space between the gum tissue and tooth, thereby resulting in plaque formation that may eventually lead to periodontal disease.

Tooth decay and periodontal disease are painful for the animal and affects the animal's overall health status. In this regard, tooth decay and periodontal disease are associated with heart disease, heart attack and cardiac arrhythmia in animals. Tooth decay and periodontal disease are also associated with damage to internal organs, such as kidneys, lungs and bladder. Such damage to internal organs, in some cases, can be life threatening. Therefore, it is important that the animal's teeth and gum tissue be regularly and adequately cleaned to avoid tooth decay and periodontal disease.

Various techniques are used to adequately clean the animal's teeth and gum tissue. For example, in the case of dogs, a simulated dog bone is used to clean the dog's teeth and gum tissue. It is believed that having such a cleaning device in the shape of a dog bone encourages the dog to use the device. In use, a pet owner provides the simulated dog bone to the dog and the dog then chews on the simulated dog bone. By chewing the simulated dog bone, the dog cleans its teeth and gum tissue.

However, some commercially available simulated dog bones are made of non-organic, indigestible, artificial materials. That is, some simulated dog bones are made of non-organic, indigestible, artificial materials such as animal rawhide, rubber (e.g., fluorocarbon, silicone, ethylene acrylic, polyurethane, etc.), nylon (i.e., polyamides comprising hexamethylenediamine and adipic acid) and even cloth. Such simulated dog bones are not intended to be digested by the dog because such simulated dog bones contain no food ingredients. Consequently, the dog obtains no nutritional benefit by using such a simulated dog bone. Also, if a portion of the simulated dog bone is inadvertently bitten-off and swallowed by the dog, serious deleterious health effects may occur due to the artificial and even carcinogenic nature of materials comprising the indigestible simulated dog bone.

Another type of commercially available simulated dog bone or dog biscuit contains food ingredients for facilitating nutritional needs of the dog, while the simulated dog bone or dog biscuit attempts to clean the dog's teeth. These types of simulated dog bones or dog biscuits comprise digestible ingredients, such as carbohydrates, proteins, fats, and fiber. More specifically, a source of carbohydrates is provided by a mixture of ground corn, wheat or rice. Sources of protein are provided by corn gluten meal, soybean meal, poultry byproduct meal, bone meal, dried liver meal, meat, milk, and/or eggs. Sources of fats are provided by plants, fish and animal by-products. Sources of fiber in the simulated dog bone or dog biscuit include dried wood that is cleaned and processed into a fine powder; corn bran used as filler and for adding bulk to the simulated dog bone or dog biscuit material; corn cellulose used to add bulk and consistency; soybean meal and wheat meal.

Such a digestible simulated dog bone or dog biscuit may also contain antioxidants, such as zinc oxide and manganese oxide, to retard decomposition of vitamins and other nutrients added to the simulated dog bone or dog biscuit and to prolong freshness of the simulated dog bone or dog biscuit. Artificial flavor enhancers simulating various flavors, such as meat or fish flavors, are also often added as ingredients to the simulated dog bone or dog biscuit to make the simulated dog bone or dog biscuit more appealing to the dog. Such flavor enhancers may contain phosphoric acid; animal digest from dead, diseased or dying animals prior to slaughter; glandular meal to provide liver flavor; plant abstracts; spice and other flavor enhancers. Many commercially available simulated dog bones or dog biscuits also contain preservatives to preserve fats present in the simulated dog bone or dog biscuit and thereby extend shelf life of the simulated dog bone or dog biscuit product in stores selling pet supply products. Such preservatives may be Butylated Hydroxysanisole antioxidant (BHA), Butylated Hydroxytoluene antioxidant (BHT), Ethoxyquin, and Propyl Gallate antioxidant.

Although dogs are color blind, coloring agents also may be added in order to make the simulated dog bone or dog biscuit more appealing to pet owners. Such coloring agents may be FD&C (federal Food, Drug & Cosmetics Act) Blue No. 2 (i.e., disodium salt of 2-(1,3-dihydro-3-oxo-5-sulfo-2H-indol-2-ylidene)-2,3-dihydro-3-oxo-1H-indole-5-sulfonic acid with smaller amounts of the disodium salt of 2-(1,3-dihydro-3-oxo-7-sulfo-2H-indol-2-ylidene)-2,3-dihydro-3-oxo-1H-indole-5-sulfonic acid and the sodium salt of 2-(1,3-dihydro-3-oxo-2H-indol-2-ylidene)-2,3-dihydro-3-oxo-1H-indole-5-sulfonic acid); FD&C Red No. 40 (i.e., disodium salt of 6-hydroxy-5-[(2-methoxy-5-methyl-4-sulfophenyl)azo]-2- naphthalenesulfonic acid); Titanium Dioxide (i.e., TiO$_2$ used as a white pigment); FD&C Yellow No. 5 (i.e., the trisodium salt of 4,5-dihydro-5-oxo-1-(4-sulfophenyl)-4-[4-sulfophenyl-azo]-1H-pyrazole-3-carboxylic acid (CAS Reg. No. 1934-21-0); FD&C Yellow No. 6 (i.e., the disodium salt of 6-hydroxy-5-[(4-sulfophenyl)azo]-2-naphthalenesulfonic acid) and other artificial colorings.

In addition, supplements are sometimes added to simulated dog bones or dog biscuits. Such supplements include bone phosphate for balancing calcium and phosphorus content of the simulated dog bone or dog biscuit; salt for added flavor and as a preservative; mineral oil to act as a stool softener and laxative; yeast culture used as a flavoring; yeast fermentation solubles used as a vitamin B supplement; synthetic vitamin E (i.e., Di-Alpha Tocopherol Acetate) in addition to other supplements.

Sweeteners are also commonly added to the simulated dog bone or dog biscuit for making the simulated dog bone or dog biscuit more appealing to the dog. Such sweeteners include cane molasses, corn syrup, fructose, sorbitol (i.e., a sweetish crystalline alcohol), processed sugar and other sweeteners.

However, the ingredients mentioned hereinabove that are added to animal food, such as simulated dog bones or dog biscuits, may cause undesirable health effects. For example, there is evidence that FD&C Yellow No. 6 is a carcinogen and may cause tumors of the adrenal gland and kidney. As another example, the previously mentioned preservatives BHA and BHT are carcinogens and may contribute to carcinogenicity or tumorigenicity. Ethoxyquin, for example, has been linked to skin allergies, cancer, and liver damage in animals. FD&C Yellow No. 5 and FD&C Yellow No. 6 may be responsible for allergic reactions in animals, as well as the previously mentioned carcinogenic effects. Processed sugar additives, such as the previously mentioned cane molasses, corn syrup, fructose, and sorbitol, may promote hypoglycemia, obesity, nervousness, cataracts, tooth decay, arthritis and allergies in animals if the sugar content is high enough. Moreover, the previously mentioned synthetic vitamins do not interact with the animal's body the same way as natural vitamins and, therefore, can cause toxicity when doses are too high and if these synthetic vitamins are not flushed from the animal's body. Such synthetic vitamins may accumulate in the animal's body and become toxic at high levels.

Therefore, it is desirable to provide animal food, such as simulated dog bones and dog biscuits, which is free of artificial or synthetic ingredients. More specifically, it is desirable that animal food not contain artificial or synthetic ingredients, such as artificial or synthetic flavoring, preservatives, coloring, supplements, sweeteners, and other unsuitable, added ingredients. As previously mentioned, artificial or synthetic ingredients can, over time, increase the health risk to the animal. Holistic, organic or all-natural ingredients, on the other hand, reduce the health risk to the animal. The terminology "organic ingredients", as used herein and as defined by the Association of American Feed Control Officers (AAFCO), means food ingredients that do not include artificial flavors, colors or preservatives. The AAFCO is a voluntary membership association of local, state and federal agencies authorized by law to regulate the sale and distribution of animal feeds and animal drug remedies.

Therefore, it is desirable to provide an animal food, such as an edible simulated dog bone or dog biscuit, which not only cleans teeth or laniaries, but also maintains or improves the animal's health status by providing suitable nutrition. In this regard, such an animal food should be free of artificial or synthetic ingredients that might otherwise cause damage to the animal's internal organs or promote allergic reactions. Consequently, such an animal food should contain organic or "all-natural" ingredients. Use of organic or all-natural ingredients in animal food, such as simulated dog bones and dog biscuits, improves digestion, provides more effective weight management, reduces costly visits to veterinarians due to animal illness, and reduces risk of food allergies. Also, use of organic or all-natural ingredients may avoid or reduce an undesirable impact on the environment because organic ingredients are generally obtained from produce and grains grown without use of pesticides that would otherwise enter ground water.

Various approaches have been suggested to accomplish proper oral hygiene for animals, such as dogs. For example, U.S. Patent Application Publication No. US 2006/0102099 A1 titled "Polymeric Dog Bone" and published May 18, 2006 in the name of Philip L. Edwards discloses a polymeric dog bone that has one or more dental care features. The polymeric dog bone disclosed in this published patent application comprises an elongated central body portion having an end portion. At least one end member extends from the end portion of the central body portion. In at least one embodiment, the end member has a first surface, a second surface, a plurality of first-shaped features located on the first surface, and a plurality of second-shaped features having a different shape than the first-shaped features located on the second surface. However, the polymeric dog bone disclosed in this published patent application lacks nutritional benefits because the polymeric dog bone is not edible:

Another approach is disclosed in U.S. Patent Application Publication No. US 2006/01017905 A1 titled "Animal Chew with Cylindrical Portion" and published May 25, 2006 in the name of Glen S. Axelrod. This published patent application discloses a method for removing plaque from the exterior surfaces of an animal's teeth. According to this published patent application, an edible animal chew is supplied that may comprise a molded body having a cylinder portion and a length on a common axial centerline, the cylinder portion comprising a curved surface and a planar surface and carrying a plurality of projections extending from the curved surface. The plurality of projections may extend radially from the curved surface and substantially perpendicular to the common axial centerline. Upon chewing by the animal on the cylinder portion of the animal chew containing the projections on the curved surface, the chew provides therapeutic action regardless of the radial direction in which the cylinder portion may be configured. This published patent application also discloses that the animal chew may be molded from a variety of materials including hard material, soft material, digestible material and indigestible material. Preferably, according to this published patent application, the animal chew is made of starch, casein, denatured and partially hydrolyzed collagen, thermoplastic polymers or mixtures thereof. In addition, this published patent application discloses that, more preferably, thermoplastic polymers include polyamides, polyurethanes and ethylene copolymers. Most preferably, according to this published patent application, the animal chew is made of a digestible material having a starch base, and in particular, wheat based starch. This published patent application further discloses that a variety of additives may be added as well, including attractants, humectants, vitamins and flavorings. Moreover, this published patent application states that the animal chew provides enhanced teeth cleaning capability and is made from an injection molding process. However, the animal chew disclosed by this published patent application does not appear to be "natural" as that terminology is used herein and as defined by the Association of American Feed Control Officers (AAFCO) because a variety of artificial additives may be present in the animal chew.

Yet another approach is disclosed in U.S. Patent Publication No. US 2008/0041320 A1 titled "Dog Chew" and published Feb. 21, 2008 in the name of Allan A. Torney, et al. This published patent application discloses a dog chew made of extruded, edible material and that has a brush-shaped head at one end and a tail at the other. The brush-shaped head and tail are connected to the head by a shaft. The brush-shaped head is provided with segments (for example six segments) with spaces between the segments adapted to be more easily manipulated in a dog's mouth, so that small pieces break off when a dog bites and chews the article. According to this published patent application, the brush-shaped head may contain individual segments having an elliptical cross section, so that a dog's tooth can work between the individual segments or "bristles." Elsewhere on the profile of the dog chew, stepped surfaces are avoided in favor of smooth, rounded surfaces, so that the dog chew is more easily handled in the dog's mouth and has an aesthetically pleasing appearance. In addition, this published patent application discloses that angled spaces between the segments of the brush-shaped head and a groove along the shaft create predetermined fracture lines so that the dog chew breaks along those fracture lines when the dog chews on it. This published patent application further discloses that a composition that yields a softer, more elastic dog chew will also tend to assist the breakage along the predetermined fracture lines. However, this published patent application does not appear to recognize a need for natural ingredients or a need to avoid artificial additives in the dog chew. Also, it appears that a dog may have difficulty placing the dog chew in its mouth given the configuration and shape of the dog chew.

Although the approaches recited hereinabove may disclose (1) a polymeric dog bone that has one or more dental care features, (2) an animal chew that provides therapeutic action regardless of the radial direction in which the cylinder portion thereof may be configured, and (3) a dog chew that is configured such that small pieces break off when a dog bites and chews the article, the approaches recited hereinabove do not appear to disclose the invention described and claimed hereinbelow.

SUMMARY OF THE INVENTION

The present invention addresses the shortcomings of the prior art approaches mentioned hereinabove by providing an edible animal chew and a method of using the same.

The edible animal chew of the invention is made from organic and all-natural ingredients. Therefore, the animal chew is free from synthetic and certain added ingredients, such as added sugars. Avoidance of synthetic and certain added ingredients obtains a health benefit for an animal, such as a dog, because risk of disease due to improper nutrition and ingestion of possible carcinogens is reduced. In addition, natural vitamins may be added to the animal chew composition to maintain and/or enhance the animal's health status.

The animal chew includes a cylindrical proximal end portion having a first surface having a plurality of first projections extending therefrom for cleaning laniaries (i.e., canine teeth) and gum tissue of the animal when the animal chews on the proximal end portion. Cleaning the laniaries and gum tissue removes food debris and plaque from the laniaries and gum tissue. Such food debris and plaque might otherwise lead to tooth decay and periodontal disease. The proximal end portion is cylindrical, so that the proximal end portion is insertable into the mouth of the animal independent of radial direction of insertion. The animal chew also includes a distal end portion in the shape of a triangular prism for facilitating insertion of the distal end portion into either a smaller mouth of a smaller animal or optionally a larger mouth of a larger animal. Also, the triangular prism shape of distal end portion reduces risk that the animal will bite-off an overly large piece of the animal chew that might otherwise cause the animal to choke. A plurality of second projections extends from a second surface of the distal end portion for cleaning laniaries and gum tissue of the animal. In addition, a plurality raised nodules are formed on a third surface opposite the second surface of the distal end portion primarily for massaging the gum tissue. Massaging the gum tissue reduces risk of periodontal disease. The nodules also necessarily remove food debris and plaque from the gum tissue in order to reduce risk of periodontal disease.

The animal chew further includes an elongated medial portion interconnecting the proximal end portion and the distal end portion. The medial portion is generally arch-shaped for facilitating upward lifting and manipulation of the animal chew by the animal. Upward lifting and manipulation of the animal chew allows the animal to more easily insert the animal chew into its mouth for chewing.

An injection mold system is used to manufacture the animal chew. The injection mold system includes a hopper for receiving a multiplicity of animal feed pellets that will ultimately form the composition of the animal chew. In this regard, the animal feed pellets are fed from the hopper to a piston chamber and thereafter compressed by a piston in order to plasticize and form the composition of the animal chew. The composition is then pushed or injected by the piston into a cavity of predetermined shape, which cavity is defined by a mold. At least one heater element is disposed near the mold for heating the mold that, in turn, bakes the composition in the cavity by means of heat conduction through the mold. The heat drives a predetermined amount of moisture from the composition to at least partially harden the composition in the cavity, so as to form the predetermined shape of the animal chew. The animal chew is retrieved from the mold, cooled and shipped to a prospective customer or placed in inventory for subsequent shipment.

According to an aspect of the present invention, there is provided an edible animal chew comprising: an elongated body having a proximal end portion, a distal end portion and a curvilinear medial portion interconnecting the proximal end portion and the distal end portion; a plurality of first projections extending from the proximal end portion; a plurality of second projections extending from the distal end portion; and a plurality of modules formed on the distal end portion.

According to another aspect of the present invention, there is provided an edible animal chew, comprising: an elongated body having a proximal end portion, a distal end portion and a curvilinear medial portion interconnecting the proximal end portion and the distal end portion, the proximal end portion having a first surface, the distal end portion having a second surface and a third surface opposite the second surface, the distal end portion being generally polyhedron-shaped; a plurality of first projections extending from the first surface; a plurality of second projections extending from the second surface; and a plurality of nodules formed on the third surface.

According to yet another aspect of the present invention there is provided an edible animal chew, comprising: an animal chewable elongated body having a generally cylindrical proximal end portion for facilitating insertion of the proximal end portion into a mouth of an animal independent of radial direction of insertion, a distal end portion generally in the shape of a triangular prism for facilitating insertion of the distal end portion into a smaller mouth or optionally a larger mouth of an animal and a generally arch-shaped medial portion for facilitating upward lifting of the elongated body by the animal, the medial portion interconnecting the proximal end portion and the distal end portion, the proximal end portion having a first surface, the distal end portion having a second surface and a third surface opposite the second surface; a plurality of first projections extending from the first surface and having a first length for cleaning a plurality of laniaries of the animal while the animal chews the elongated body; a plurality of second projections extending from the second surface and having a second length greater than the first length for cleaning the plurality of laniaries of the animal while the animal chews the elongated body; and a plurality of raised nodules formed on the third surface for periodontal massage while the animal chews the elongate body.

According to a further aspect of the present invention, there is provided a method of using an edible animal chew, comprising the steps of: facilitating insertion of a generally cylindrical-shaped proximal end portion of an edible animal chewable elongated body into a mouth of an animal, the proximal end portion being generally cylindrical for insertion independent of radial direction of insertion, the proximal end portion having a first surface; facilitating insertion of a triangular prism-shaped distal end portion of the elongated body into a smaller mouth of a smaller animal or optionally into a larger mouth of a larger animal, the distal end portion having a second surface and a third surface opposite the second surface; facilitating upward lifting of the elongated body by the animal while the animal manipulates a medial portion of the elongated body, the medial portion interconnecting the proximal end portion and the distal end portion; cleaning a plurality of laniaries of the animal while the animal chews the elongated body by contacting the plurality of laniaries with a plurality of first projections extending from the first surface and having a first length; cleaning the plurality of laniaries of the animal while the animal chews the elongated body by contacting the plurality of laniaries with a plurality of second projections extending from the second surface and having a second length greater than the first length; and massaging periodontal tissue of the animal while the animal chews the elongated body by contacting the periodontal tissue with a plurality of raised nodules formed on the third surface.

A feature of the present invention is the provision of an elongated body having a generally cylindrical proximal end portion for facilitating insertion of the proximal end portion into the mouth of the animal independent of radial direction of insertion.

Another feature of the present invention is the provision of a distal end portion in the shape of a triangular prism for facilitating insertion of the distal end portion into either a smaller mouth of a smaller animal or optionally a larger mouth of a larger animal.

An additional feature of the present invention is the provision of an elongated medial portion interconnecting the proximal end portion and the distal end portion, the medial portion being generally arch-shaped for facilitating upward lifting and manipulation of the animal chew by the animal.

A further feature of the present invention is the provision of a plurality of first projections radially outwardly extending from the proximal end portion for cleaning laniaries and gum tissue of the animal.

Another feature of the present invention is the provision of a plurality of second projections outwardly extending from the distal end portion for cleaning laniaries and gum tissue of the animal.

Yet another feature of the present invention is the provision of a plurality of raised nodules formed on the distal end portion for messaging the gum tissue of the animal and for removing food debris and plaque from the gum tissue.

In addition to the foregoing, various other method and/or device aspects and features are set forth and described in the teachings, such as text (e.g., claims and/or detailed description) and/or drawings of the present invention.

The foregoing is a summary and thus may contain simplifications, generalizations, inclusions, and/or omissions of detail. Consequently, those skilled in the art will appreciate that the summary is illustrative only and is not intended to be in any way limiting. In addition to the illustrative aspects, embodiments, and features described hereinabove, further aspects, embodiments, and features will become apparent by reference to the drawings and the following detailed description.

BRIEF DESCRIPTION OF THE DRAWINGS

The invention will be more fully understood by reference to the detailed description in conjunction with the following figures, wherein.

DETAILED DESCRIPTION OF PREFERRED EMBODIMENTS

Figure 1:
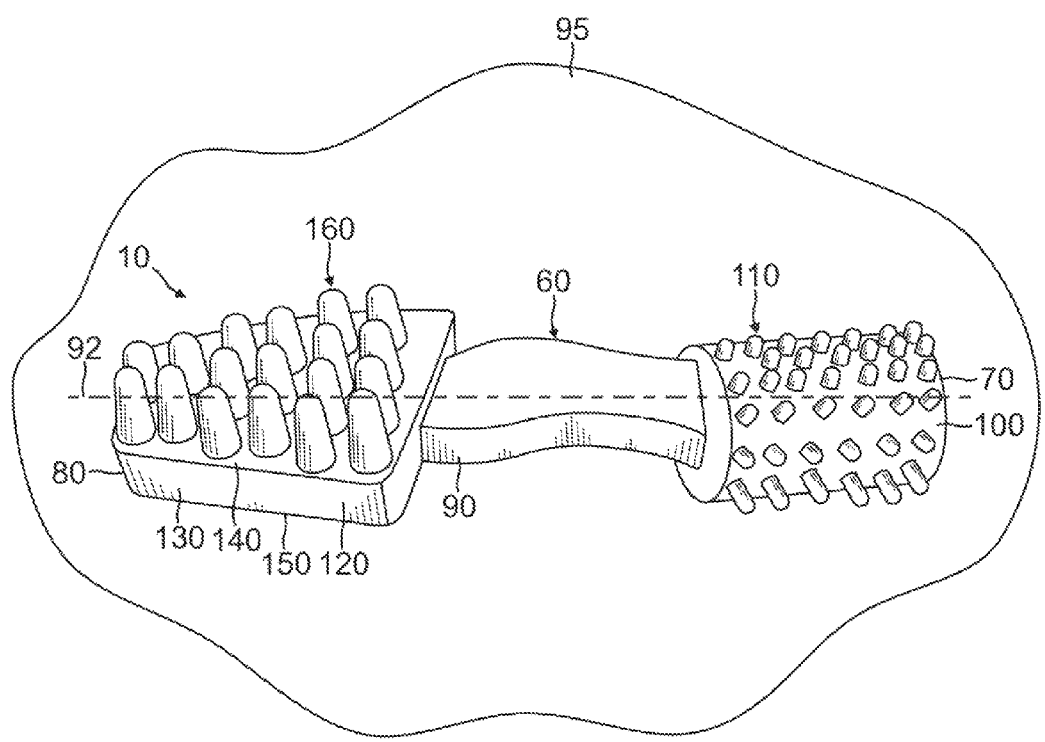
FIG. 1 is a view in perspective showing a top side of a first embodiment edible animal chew.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from either the spirit or scope of the invention.

In addition, the present patent specification uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Therefore, with reference to FIGS. 1, 2, 3 and 4, there is shown a first embodiment edible animal chew, generally referred to as 10, for cleaning laniaries 20 and periodontal gum tissue 30 in an oral cavity or mouth 40 (see FIG. 12) of an omnivorous and carnivorous animal indicated generally at 50 (see FIG. 12), such as a dog. First embodiment edible animal chew 10 provides nutritional benefits to animal 50 as animal 50 chews first embodiment edible animal chew 10 to clean laniaries 20 and gum tissue 30.

It will be understood from the description hereinbelow that first embodiment edible animal chew 10 is capable of substantially removing food debris, dead cells and protein-containing matter that could lead to formation of plaque on laniaries 20 and gum tissue 30 of animal 50. Removal of plaque reduces risk of tooth decay and periodontal disease that, in turn, might lead to organ damage and decreased health status in animal 50. It also will be understood from the description hereinbelow that composition of first embodiment edible animal chew 10 comprises only "natural ingredients", such that added sugars, added fats, preservatives, coloring, flavoring, and synthetic vitamins are not present in the composition. Absence of such added sugars, added fats, preservatives, coloring, flavoring, and synthetic vitamins reduces risk of accumulation of carcinogens in animal 50 and the cancer risk associated with accumulation of carcinogens. In addition, absence of such added sugars, added fats, preservatives, coloring, flavoring, and synthetic vitamins reduces risk of hypoglycemia, obesity, nervousness, cataracts, tooth decay, arthritis and allergies in animal 50.

Referring again to FIGS. 1, 2, 3 and 4, first embodiment edible animal chew 10 comprises an elongated body 60 having a proximal end portion 70, a distal end portion 80 and an elongated medial portion 90 interconnecting proximal end portion 70 and distal end portion 80. First embodiment animal chew 10 is configured, such that animal 50 can more easily manipulate elongated body 60 in order to chew and bite-off a portion of first embodiment animal chew 10 without chocking. In this regard, proximal end portion 70, distal end portion 80 and medial portion 90 of elongated body 60 may be aligned along a longitudinal center axis 92, so that animal 50 can more easily manipulate elongated body 60 in order to insert a necessary portion of elongated body 60 into mouth 40 of animal 50. More specifically, In addition, medial portion 90 is integrally connected to proximal end portion 70 at one end of medial portion 90 and is integrally connected to distal end portion 80 at the other end of medial portion 90, so that elongated body 60 forms a single, one-piece construction. Medial portion 90 is curvilinear in shape. Curvilinear medial portion 90 may be in the shape of an arch, as shown, for facilitating upward lifting by animal 50 of first embodiment edible animal chew 10 from a surface 95 regardless of orientation of first embodiment edible animal chew 10 on surface 95. In addition, if desired, medial portion 90 may be scored at a location adjacent to distal end portion 80, for providing a fracture region 97 of reduced thickness. Fracture region 97 allows an owner of animal 50 to more easily break or separate distal end portion 80 from medial portion 90 in order to allow animal 50 only to consume distal end portion 80 or only to consume medial portion 90 and proximal end portion 70. This feature of first embodiment edible animal chew 10 allows the pet owner to manage meal portions fed to animal 50. Management of meal portions fed to animal 50 assists in avoiding obesity in animal 50. It may be appreciated by a person of ordinary skill in the art of animal husbandry, that additional fracture regions may be located at other locations in first embodiment edible animal chew 10 for further managing portions of first embodiment edible animal chew 10 fed to animal 50.

As shown in FIGS. 1, 2, 5, 6, 7 and 8, proximal end portion 70 is generally cylindrical and defines a circumferential first surface 100 thereon. Integrally attached to first surface 100 is a plurality of piles, ribs, prolongations or first projections indicated generally at 110. The first projections 110 radially extend from, and are disposed in a pattern extending around, the entire first surface 100. The pattern may be a uniform pattern or a random pattern. Further, first projections 110 are oriented perpendicularly with respect to center axis 92. Proximal end portion 70 and first projections 110 are suitably sized to be insertable into the mouth 40 of animal 50, so that first projections 110 intimately contact or scrape laniaries 20 and gum tissue 30 to suitably clean laniaries 20 and gum tissue 30. In this regard, cylindrical proximal end portion 70 and first projections 110 may have dimensions as provided hereinbelow.

Referring to FIGS. 5, 6, 7 and 8, first projections 110 can have a multiplicity of suitable shapes to adequately clean laniaries 20 and gum tissue 30. For example, first projections 110 may be generally conically-shaped with the widest dimension thereof integrally connected to first surface 100. Alternatively, first projections 110 may be generally cylindrically-shaped. In any case, first projections 110 may have rounded edges that scrape animal's 50 laniaries 20 as animal 50 chews elongated body 60. In addition, each of first projections 110 has a predetermined overall width and length for adequately cleaning laniaries 20 of animal 50. For example, first projections 110 may have a predetermined smaller overall width and length for adequately cleaning laniaries 20 of smaller size, such as is found in smaller animals 50.

Returning to FIGS. 1, 2, 3 and 4, distal end portion 80 is generally polyhedron-shaped, such as in the tapered shape of a triangular prism. In this regard, distal end portion 80 has a first end portion 120 of a first predetermined width and a second end portion 130 opposite first end portion 120, the second end portion having a second predetermined width. The second predetermined width of second end portion 130 is less than the first predetermined width of first end portion 120 for defining the tapered triangular prism shape of distal end portion 80. The tapered triangular prism shape of distal end portion 80 allows animal 50 to more conveniently begin chewing first embodiment edible animal chew 10 and reduces risk that a large piece of first embodiment edible animal chew 10 will be bitten-off. Therefore, the tapered triangular prism shape of distal end portion 80 mitigates the risk that biting-off a large piece of first embodiment edible animal chew 10 might lead to choking. In addition, the tapered triangular prism shape of distal end portion 80 allows for longer chewing time which means laniaries 20 and gum tissue 30 will be more thoroughly cleaned.

Referring to FIGS. 1, 2, 3, 4, 5, 6, 7, 8 and 9, distal end portion 80 of first embodiment edible animal chew 10 has a planar second surface 140 thereon and a planar third surface 150 opposite second surface 140. Outwardly extending from second surface 140 and perpendicular to second surface 140 is a plurality of piles, ribs, prolongations or second projections 160. Second projections 160 are disposed in a predetermined pattern on second surface 140. The pattern may be a uniform pattern or a random pattern. Distal end portion 80 and second projections 160 are suitably sized to be insertable into the mouth 40 of animal 50, so that second projections 160 intimately contact or scrape laniaries 20 and gum tissue 30 to suitably clean laniaries 20 and gum tissue 30. In this regard, distal end portion 80 and second projections 160 may have dimensions as provided hereinbelow. Second projections 160 can have a multiplicity of suitable shapes to adequately clean laniaries 20 and gum tissue 30. For example, second projections 160 may be generally conically-shaped with the widest dimension thereof integrally connected to second surface 140. Alternatively, second projections 160 may be generally cylindrically-shaped or may have any suitable shape for adequately cleaning laniaries 20 and gum tissue 30. Second projections 160 have rounded ends that scrape animal's 50 laniaries 20 as animal 50 chews elongated body 60. Such rounded ends may enhance cleaning effectiveness of laniaries 20 by more efficiently scraping food particles and plaque from laniaries 20 gum tissues 30. Moreover, second projections 160 may have a greater predetermined overall width and length than the predetermined overall width and length of first projections 110 for adequately cleaning laniaries 20 of larger size, such as is present in larger animals 50.

Referring to FIGS. 2, 4, 6, 8 and 9, formed on third surface 150 is a plurality of raised bumps, protuberances or nodules 170 for massaging gum tissue 30 of animal 50. Nodules 170 are disposed in a predetermined pattern on third surface 150. The pattern may be a uniform pattern or a random pattern. Each of nodules 170 may have a generally convex contour for intimate contact with gum tissue 30 while any part of distal end portion 80 resides in mouth 40 of animal 50. While a principle purpose of nodules 170 is to massage gum tissue 30, it should be appreciated that nodules 170 also remove plaque and food debris from gum tissue 30 as nodules 170 massage gum tissue 30. Regular massaging of gum tissue 30 and removal of food debris and plaque from gum tissue 30 reduces risk of periodontal disease developing in gum tissue 30.

Thus, it should be appreciated from the teachings hereinabove that first embodiment edible animal chew 10 is configured to be "asymmetrical" about longitudinal center axis 92 for more effectively cleaning the teeth of animal 50. More specifically, first embodiment edible animal chew 10 has previously mentioned proximal end portion 70 that is generally cylindrical in shape. Radially extending from first surface 100 of the cylindrical shape that belongs to proximal end portion 70 are first projections 110. Distal end portion 80 has the previously mentioned tapered triangular prism shape. The tapered triangular prism shape defined by distal end portion 80 has a second surface 140 located on a top side of the tapered triangular prism shape. Second projections 160 outwardly extend from second surface 140, as previously mentioned. The tapered triangular prism shape defined by distal end portion 80 also has previously mentioned third surface 150 that is located on an underside of the tapered triangular prism shape. Formed on third surface 150 is the previously mentioned plurality of nodules 170. Hence, the topside of the tapered triangular prism shape belonging to distal end portion 80 and the underside of the tapered triangular prism shape are asymmetrical (i.e., differently configured). In addition, proximal end portion 70 and distal end portion 80 are also asymmetrical (i.e., differently configured). It is desirable that the first embodiment edible animal chew 10 be asymmetrical in order to allow animal 50 to start chewing more easily. In other words, if the first embodiment edible animal chew 10 were configured to be symmetrical about longitudinal center axis 92, animal 50 would not have a convenient angle to start chewing, which could lead to animal 10 taking a larger bite in order to get a better grip on the first embodiment edible animal chew 10. In addition, the asymmetrical configuration of first embodiment edible animal chew 10 causes animal 50 to counter-balance first embodiment edible animal chew 10 while animal 50 chews first embodiment edible animal chew 10. This counter-balancing effect associated with forces acting on the shape of first embodiment edible animal chew 10 as animal 50 chews, forces one side upwardly when animal 50 presses against the other side of first embodiment edible animal chew 10. This is intended to reduce the chance of animal 50 taking an initially large bite that could lead to choking or blockage in the throat of animal 50.

Another desirable feature of first embodiment edible animal chew 10 is the different shapes and sizes of projections 110 at proximal end portion 70, projections 160 at distal end portion 80 and nodules 170 at distal end portion 80. Nodules 170 allow animal 50 to take smaller bites initially and also help massage the gums and clean the teeth by giving different contact points when chewing. The projections 110/160 help with these two functions as well as a third function. This third function is referred in the art as "chewing confusion." Chewing confusion occurs when animal 50 gets into a chewing rhythm. When animal 50 takes a bite, animal 50 will get the food item into the proper direction and then will begin to chew to reduce the size of food item that animal 50 can swallow. As chewing continues, animal 50 will use the front of its tongue to move the food around and will use the back of the tongue to help push the item down its throat. When animal 50 bites on the side of the first embodiment edible animal chew 10, projections 160/170 break-off. Since projections 160/170 were not the piece animal 50 was planning on consuming, animal 50 has to spend more time either getting it into alignment or re-establishing his rhythm. Both of these events, spending more time getting the food into its mouth, and re-establishing its rhythm, forces the animal 50 to chew longer. Since all dental treats work on the same theory of cleaning, the longer animal 50 chews, the cleaner his teeth will become.

Figure 2:
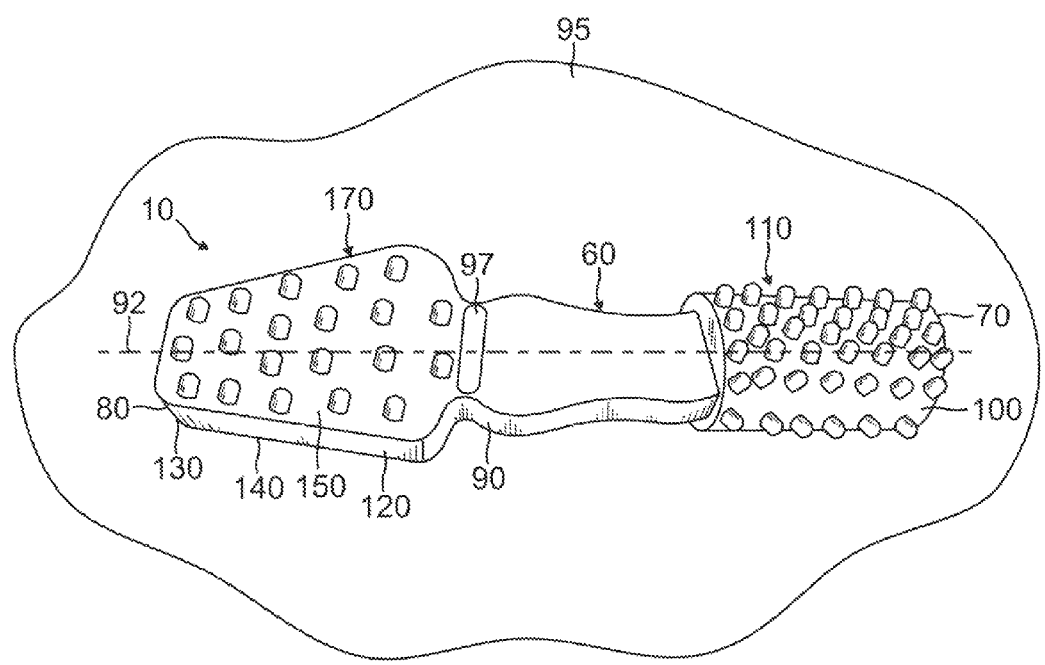
FIG. 2 is a view in perspective showing a bottom side of the first embodiment edible animal chew.

With specific reference to FIGS. 1 and 2, the previously mentioned elongated curvilinear medial portion 90 is shown as arch-shaped. However, it may be appreciated that curvilinear medial portion 90 may have any suitable curvilinear contour along its length, such as a plurality of side-by-side integrally connected arches (not shown) along its length or any other undulating contour to facilitate upward lifting by animal 50 of first embodiment edible animal chew 10 from surface 95 regardless of orientation of first embodiment edible animal chew 10 on surface 95. As another alternative, medial portion 90 need not be curvilinear, if desired. In other words, medial portion 90 may be formed so as to be flat or planar (also not shown), but positioned at a height above surface 95 regardless of orientation of first embodiment edible animal chew 10 on surface 95.

Returning to FIGS. 1, 2, 3, 4, 5, 6, 7, 8 and 9, first embodiment edible animal chew 10 can be variously sized to be received in mouth 40 of larger, smaller and medium size animals 50. An example of a small size animal is the Chihuahua dog, which weighs about six to about eight pounds and has 42 evenly spaced laniaries meeting in a level bite or "scissors bite." A typical inclusion, which is the manner that laniaries align with each other, has upper incisors that overlap lower incisors. This is referred to in the art as a "scissors bite." An example of a medium size animal is the Australian Shepherd dog, which weighs about 20 to about 60 pounds and also has 42 laniaries that meet in a scissors bite. An example of a large size animal is the German Shepherd dog, which weighs about 75 to about 80 pounds and has 42 laniaries and a scissors bite. It has been observed that the configuration of first embodiment edible dog chew 10 efficiently cleans laniaries 20 of animals evincing a scissors bite and effectively massages and cleans gum tissue 30, as animal 50 routinely chews food using the scissors bite. It should be appreciated, based on the teachings herein, that first embodiment edible animal chew 10 and second embodiment edible animal chew 160 to clean laniaries 20 and gum tissue 30 of small, medium and large size animals 50. By way of example only, and not by way of limitation, exemplary dimensions associated with first embodiment chew 10 are provided in Table 1 immediately hereinbelow.

TABLE 1

Exemplary Dimensions of First Embodiment Animal Chew 10

| Dimensions Shown In | | Exemplary Dimensions (inches) | | |
| --- | --- | --- | --- | --- |
| FIGS. 3, 5, 6, 7 and 8. | Description of Dimensions Shown In Figure | Small Size Animal | Medium Size Animal | Large Size Animal |
| D | Diameter of proximal end portion 70. | 0.50 | 0.75 | 1.00 |
| H1 | Height of first projections 110. | 0.50 | 0.75 | 1.00 |
| H2 | Height of second projections 160. | 0.70 | 0.80 | 1.20 |
| H3 | Height of nodules 170. | 0.25 | 0.40 | 0.50 |
| L1 | Length of elongated body 60. | 2.95 | 4.13 | 4.92 |
| L2 | Length of proximal end portion 70. | 0.74 | 1.03 | 1.23 |
| L3 | Length of medial portion 90. | 0.97 | 1.00 | 1.62 |
| L4 | Length of distal end portion 80. | 1.24 | 1.36 | 2.07 |
| T | Thickness of distal end portion 80. | 2.50 | 4.50 | 5.00 |
| W1 | Widest dimension of medial portion 90. | 0.50 | 0.75 | 1.00 |
| W2 | Narrowest portion of distal end portion 80. | 0.56 | 0.75 | 0.94 |
| W3 | Widest dimension of distal end portion 80. | 0.75 | 1.00 | 1.25 |
| W4 | Width of first projections 110. | 0.12 | 0.20 | 0.25 |
| W5 | Space between adjacent first projections 110. | 0.06 | 0.10 | 0.12 |
| W6 | Width of second projections 160. | 0.32 | 0.40 | 0.45 |
| W7 | Space between adjacent second projections 160. | 0.08 | 0.10 | 0.14 |
| W8 | Width of nodules 170. | 0.10 | 0.15 | 0.20 |
| W9 | Space between adjacent nodules 170. | 0.20 | 0.25 | 0.50 |

Figure 3:
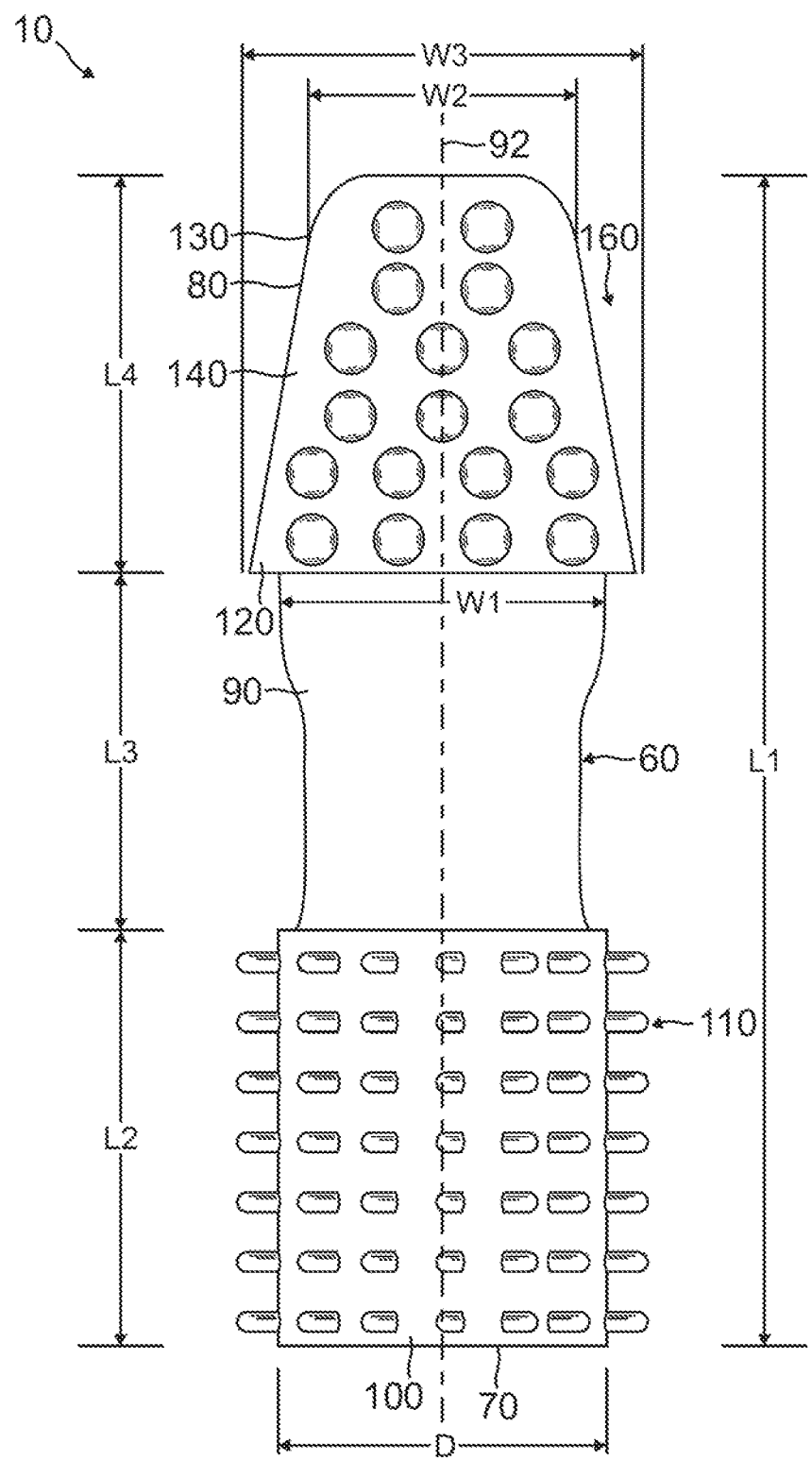
FIG. 3 is a view in elevation showing the top side of the first embodiment edible animal chew.
Figure 4:
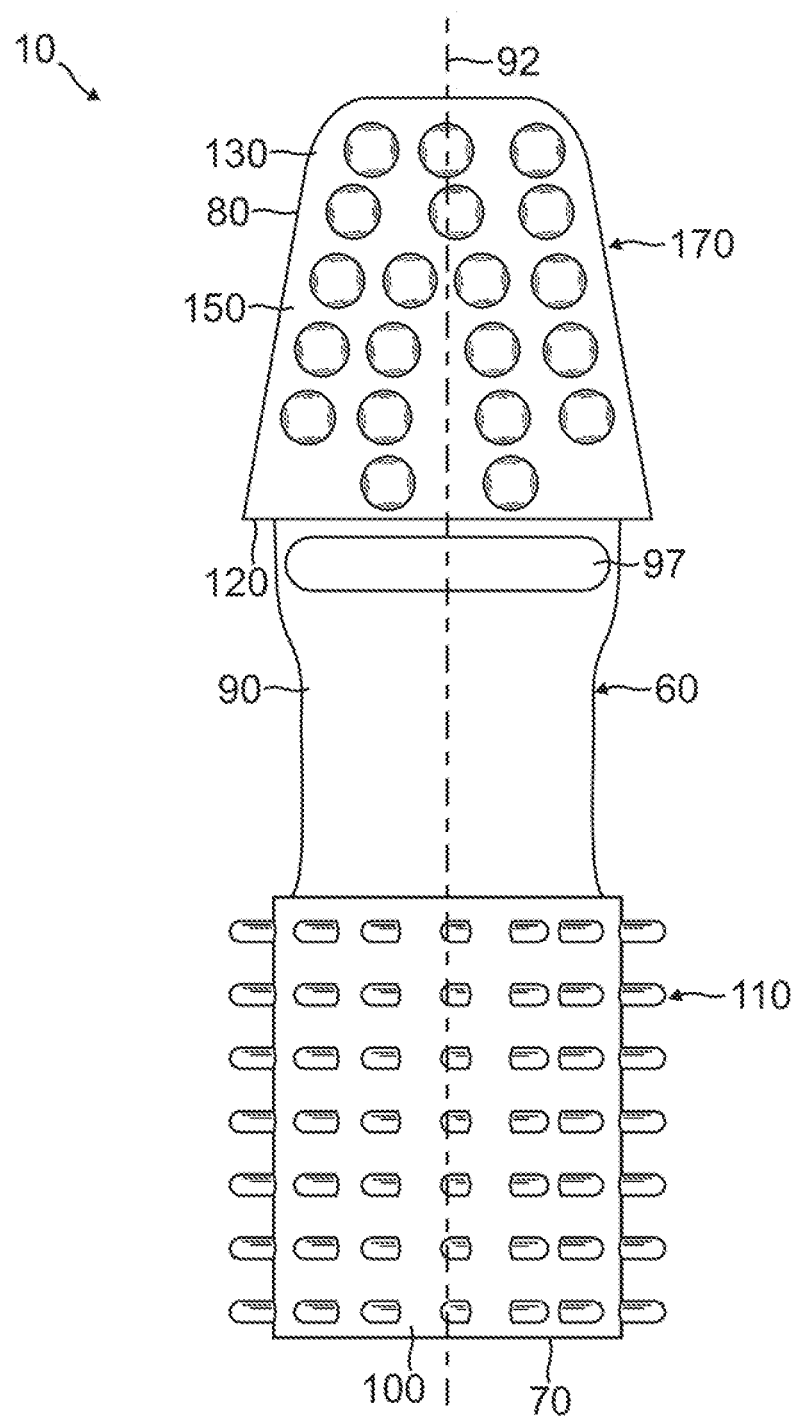
FIG. 4 is a view in elevation showing the bottom side of the first embodiment edible animal chew.
Figure 5:
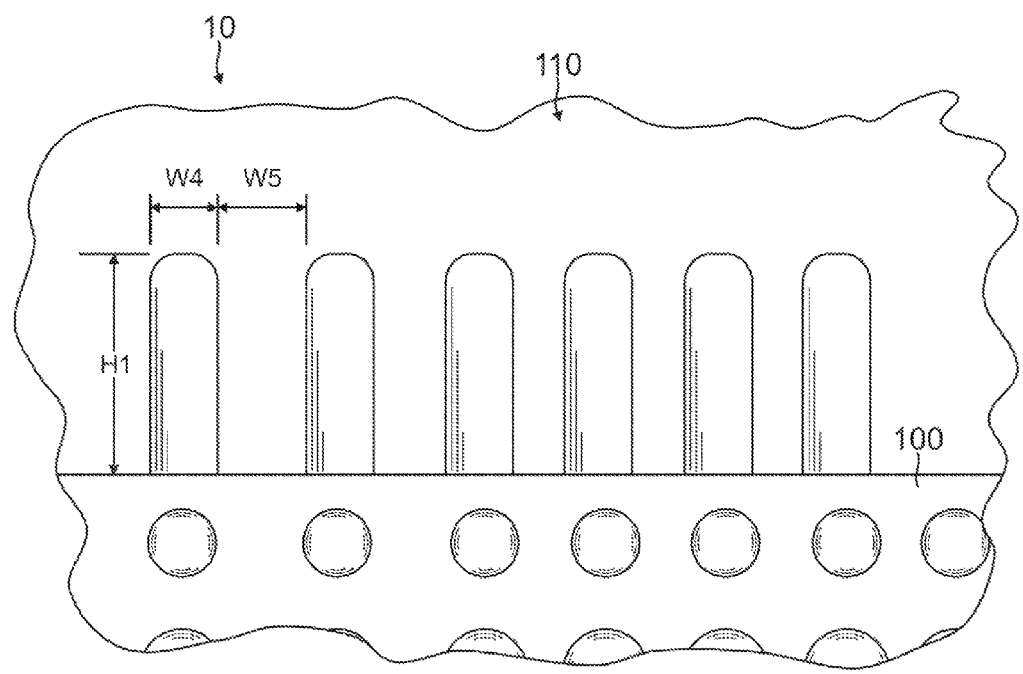
FIG. 5 is a fragmentary view in elevation of a proximal end portion of the first embodiment edible animal chew, this view also showing a plurality of first projections having a cylindrically-shaped contour.
Figure 6:
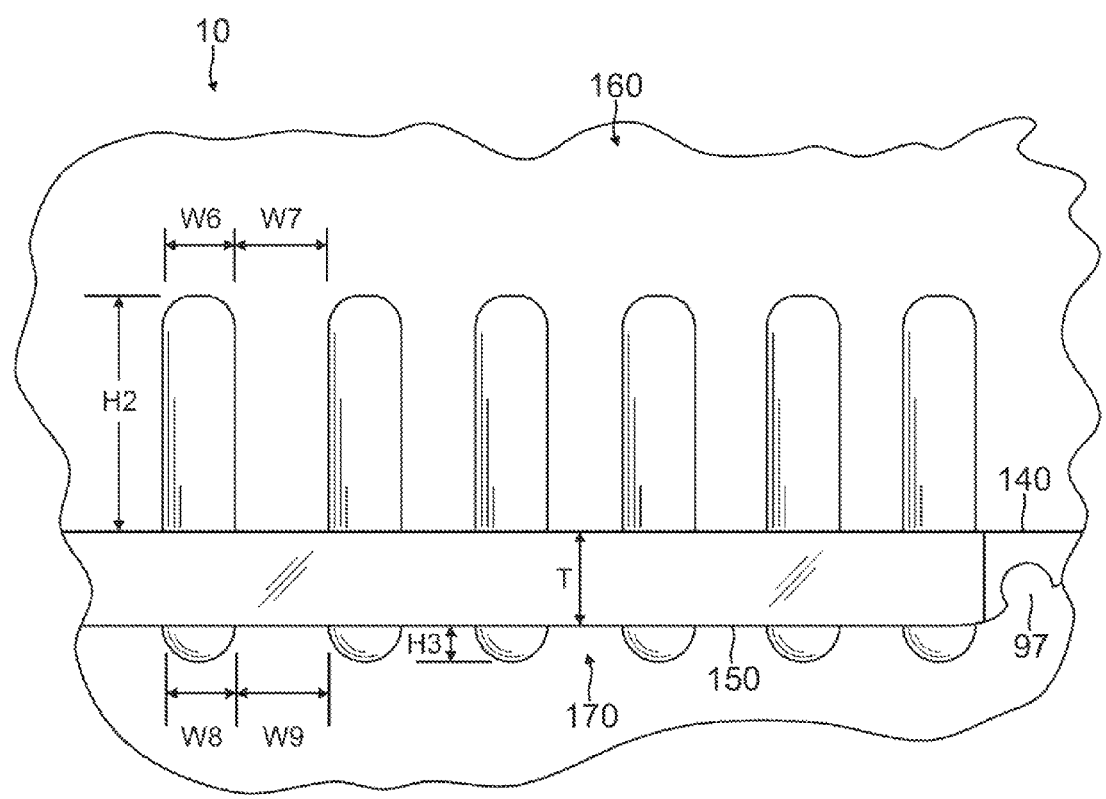
FIG. 6 is a fragmentary view in elevation of a distal end portion of the first embodiment edible animal chew, this view also showing a plurality of second projections having a cylindrically-shaped contour and further showing a plurality of raised nodules.
Figure 7:
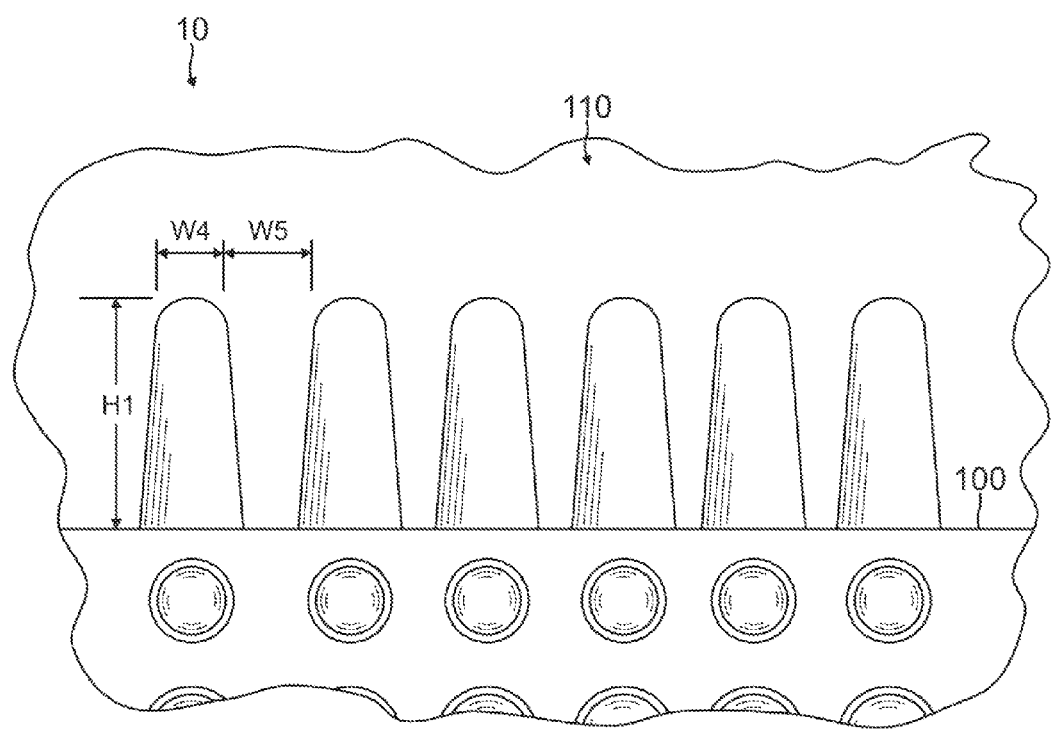
FIG. 7 is a fragmentary view in elevation of the proximal end portion of the first embodiment edible animal chew, this view also showing the plurality of first projections having a conically-shaped contour.
Figure 8:
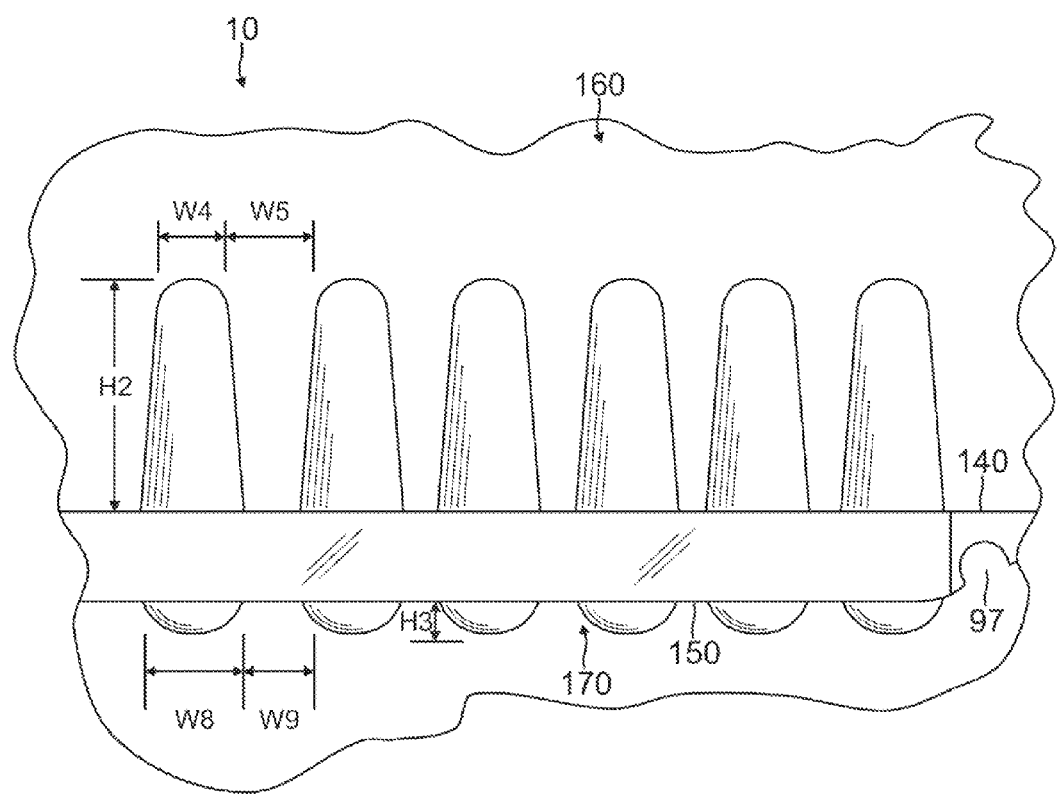
FIG. 8 is a fragmentary view in elevation of the distal end portion of the first embodiment edible animal chew, this view also showing the plurality of second projections having a conically-shaped contour and further showing the plurality of raised nodules.
Figure 9:
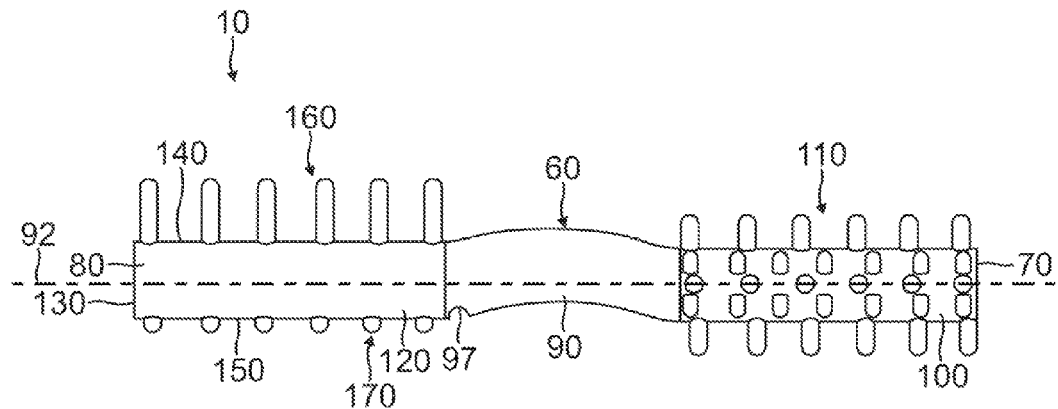
FIG. 9 is a side view in elevation of the first embodiment edible animal chew.

Thus, with reference to FIGS. 3 and 4 and also with reference to Table 1 hereinabove and depending on the size of animal 50, diameter D of proximal end portion 70 may range from about 0.50 inch to about 1.00 inch. Height H1 of generally cylindrically-shaped first projections 110 may range from about 0.50 inch to about 1.00 inch; height H2 of generally cylindrically-shaped second projections 160 may range from about 0.70 inch to about 1.20 inches; and height H3 of nodules 170 may range from about 0.25 inch to about 0.50 inch. Length L1 of elongated body 60 may range from about 2.95 inches to about 4.92 inches; length L2 of proximal end portion 70 may range from about 0.74 inch to about 1.23 inches; length L3 of medial portion 90 may range from about 0.97 inch to about 1.62 inches; and length L4 of distal end portion 80 may range from about 1.24 inches to about 2.07 inches. Thickness T of distal end portion 80 may range from about 2.50 inches to about 5.00 inches. In addition, width W1 of the widest dimension of medial portion 90 may range from about 0.50 inch to about 1.00 inch; width W2 of the narrowest portion of distal end portion 80 may range from about 0.56 inch to about 0.94 inch; width W3 of the widest dimension of distal end portion 80 may range from about 0.75 inch to about 1.25 inches; and width W4 of cylindrically-shaped first projections 110 may range from about 0.12 inches to about 0.25 inch. Also, space W5 between adjacent ones of the plurality of cylindrically-shaped first projections 110 may range from about 0.06 inch to about 0.12 inch. Width W6 of cylindrically-shaped second projections 160 may range from about 0.32 inches to about 0.45 inch; space W7 between the plurality of cylindrically-shaped first projections 160 may range from about 0.08 inch to about 0.14 inch. In addition, width W8 of nodules 170 may range from about 0.10 inch to about 0.20 inch, and space W9 between nodules 170 may range from about 0.20 inch to about 0.50 inch. However, it should be appreciated that the dimensions presented in Table 1 are exemplary only and may be any suitable dimensions desired.

With reference to FIGS. 1, 2, 3, 4, 5, 6, 7, 8, 9 and Table 1, first projections 110 and second projections 160 may be generally conically-shaped rather than generally cylindrically-shaped, as previously mentioned. Dimensions associated with elongated body 60 having conically-shaped projections are substantially similar to the dimensions of elongated body 60 having generally cylindrically-shaped projections. The pointed contour of conically-shaped projections, however, may allow deeper insertion of projections 110 and 160 between laniaries 20 of animal 50, particularly when animal 50 has closely-spaced laniaries.

In addition, first embodiment edible animal chew 10 may obtain various weights depending on size of first embodiment edible animal chew 10. Weight of first embodiment edible animal chew 10 is predetermined for facilitating upward lifting by animal 50 of first embodiment edible animal chew 10 from a surface 95, as previously mentioned. By way of example only, and not by way of limitation, exemplary weights associated with first embodiment edible animal chew 10 for animals of various sizes are provided in the Table 2 immediately hereinbelow.

TABLE 2

Exemplary Weights of First Embodiment Animal Chew 10

| Animal Size | Exemplary Weights In Pounds for First Embodiment Animal Chew 10 |
|---|---|
| Small | 0.022 (i.e., 10 grams) |
| Medium | 0.049 (i.e., 22 grams) |
| Large | 0.092 (i.e., 42 grams) |

Thus, with reference to Table 2 hereinabove and depending on the size of animal 50, weight of first embodiment edible animal chew 10 may range from about 0.022 pounds to about 0.092 pounds. However, it should be appreciated that the weights presented in Table 2 are exemplary only and may be any suitable weights desired.

Figure 10:
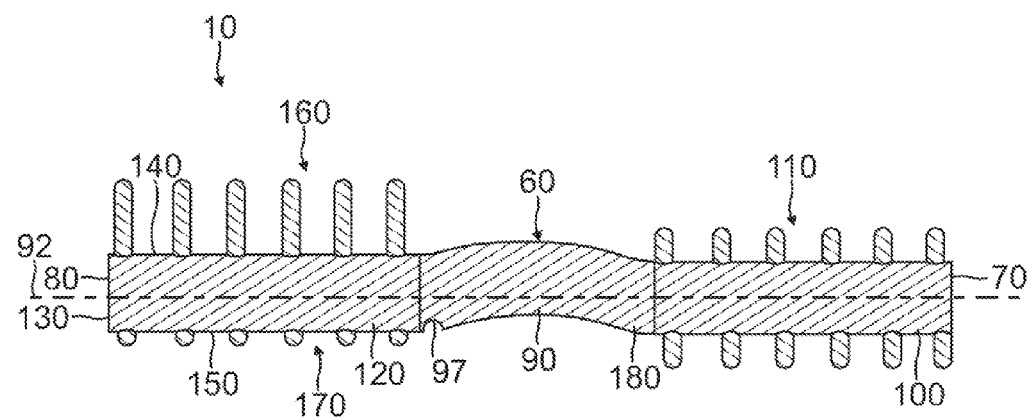
FIG. 10 is a side view in vertical section of the first embodiment edible animal chew, this view also showing the first embodiment animal chew comprising an edible composition.

Turning now to FIG. 10, first embodiment edible animal chew 10 comprises an edible composition 180. By way of example only, and not by way of limitation, edible composition 180 may be selected from a group consisting essentially of a protein, a fat, a fiber and combinations thereof. The edible composition 180 is organic or "all-natural" as the terminology "all-natural" is defined hereinabove. In this regard, edible composition 180 is free of artificial flavors, colors and preservatives. Also, it is desirable that organic or all-natural ingredients comprising edible composition 180 be produced or grown without use of pesticides or synthetic chemicals in order to avoid a detrimental effect on the environment or biosphere. In addition, the organic or all-natural edible composition 180 is free of added sugars, starches and synthetic vitamins. Therefore, although not critical, it is nonetheless important that edible composition 180 be organic or all-natural in order to reduce risk of carcinogenicity or tumorigenicity that artificial flavors, colors or preservatives might otherwise promote in animal 50. Edible composition 180 is also organic or all-natural in order to reduce risk of hypoglycemia, obesity, nervousness, cataracts, tooth decay, arthritis and allergies that added sugars and starches might otherwise cause in animal 50. In addition, edible composition 180 is also organic or all-natural in order to reduce risk of toxicity that synthetic vitamins might otherwise produce in animal 50. By way of example only, and not by way of limitation, exemplary weight percentages for ingredients comprising edible composition 180 and that are applicable to a medium size adult dog are presented in Table 3 immediately hereinbelow.

TABLE 3

Exemplary Weight Percentages for Ingredients Comprising Edible Composition 180

| Organic or All-Natural Ingredient | Exemplary Weight Percentage |
|---|---|
| Crude Protein | 24.8% |
| Crude Fat | 16.1% |
| Carbohydrate | 51.3% |
| Crude Fiber | 2.2% |
| Other (e.g., moisture, etc.) | 5.6% |

With reference to Table 3 hereinabove, the edible ingredients listed in Table 3 may be selected from a group consisting essentially of chicken meal, turkey meal, salmon meal, chicken fat, whole dried egg, soya, corn, rice, yeast, cold pressed organic sunflower and soy oil, salmon oil, natural enzymes, kelp, vegetarian chicken or meat flavor and combinations thereof. Also, it should be appreciated that the weight percentages listed in Table 3 will vary depending on age, size, activity level, and health status of animal 50.

Figure 11:
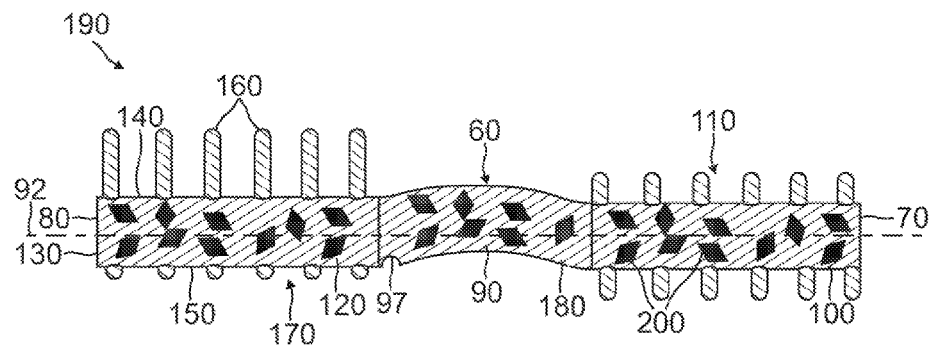
FIG. 11 is a side view in vertical section of a second embodiment edible animal chew, this view also showing the second embodiment edible animal chew comprising the edible composition and including a plurality of natural vitamin particles dispersed or distributed therein.
Figure 12:
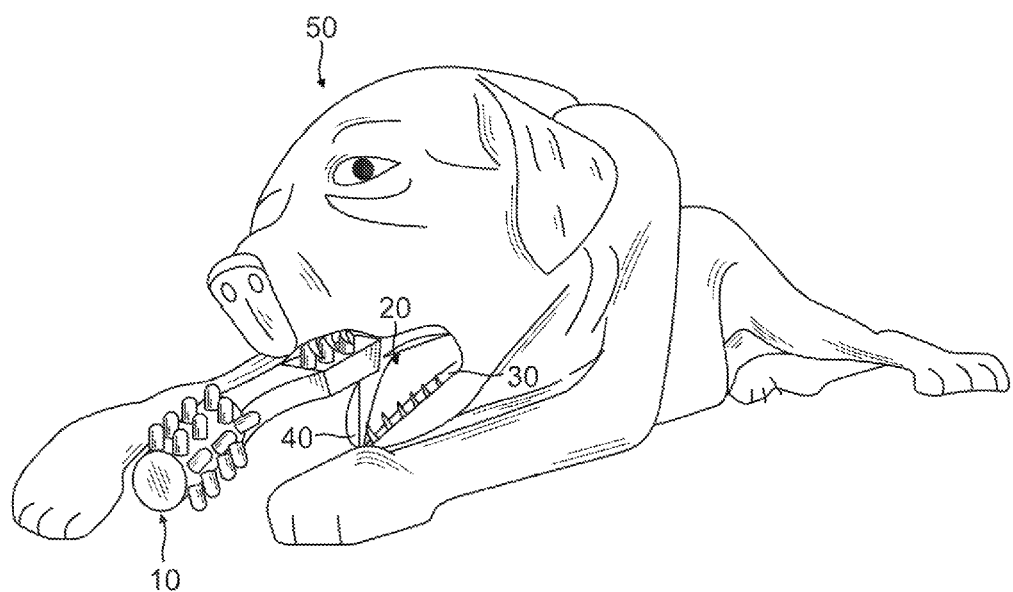
FIG. 12 is a view in perspective of either the first embodiment or the second embodiment edible animal chew being chewed by an animal, such as a dog.

Referring to FIGS. 11 and 12, there is shown a second embodiment animal chew, generally referred to as 190. The second embodiment animal chew 190 is substantially similar to first embodiment edible animal chew 10, except that a plurality of organic and all-natural vitamin particles 200 is either homogeneously or heterogeneously distributed in edible composition 180. By way of example only, and not by way of limitation, organic and all-natural vitamin particles 200 may be provided by the organic or all-natural sources listed in Table 4 immediately hereinbelow.

TABLE 4

All-natural Vitamins Particles 200 Provided By All-natural Sources

| All-Natural Vitamin | All-Natural Source |
|---|---|
| A | Kelp |
| B-complex | Meat, wheat germ, dairy, yeast |
| C | Kelp, Rose hips (i.e., the berry-like brightly colored fruit of a rose plant) |
| D | Alfalfa, Kelp |
| E | Kelp, Alfalfa |
| K | Alfalfa |

Thus, with reference to Table 4 hereinabove, there is a plurality of all-natural vitamins and sources of all-natural vitamins included in composition 200. However, it should be appreciated that the all-natural vitamins and all-natural sources of vitamins presented in Table 4 are exemplary only and may be any suitable all-natural vitamins and sources of all-natural vitamins desired.

Also, the vitamins listed in Table 4 are associated with various health benefits for animal 50. In this regard, Vitamin A is associated with skeletal growth, testicular and ovarian function, embryonic development, differentiation of tissues, proper eye function and cataract reduction, healthy skin, healthy mucous membranes, and proper immune system response. Vitamin B-complex is associated with proper metabolism of carbohydrates, fats, proteins, and production of red blood cells; proper functioning of the immune system; maintenance of muscle tone in the gastrointestinal tract; and maintenance of healthy skin, coat, eyes, mouth and liver. Vitamin C serves as an antioxidant and is also associated with protection of brain cells; protection of the spinal cord; reduced risk of cataracts; and promotion of cell growth and tissue repair. Vitamins D, E and K are associated with increased appetite, alleviation of some allergic reactions, improved digestion, and may also reduce inflammation due to arthritis and rheumatism.

Referring again to FIGS. 11, 12 and Table 4, it should be understood, based on the teachings hereinabove, that second embodiment animal chew 190 is not only capable of cleaning laniaries 20 and gum tissue 30, but also provides vitamin therapy for beneficially maintaining and improving the health status of animal 50. This is so because vitamin particles 200 mitigate effects of vitamin deficiency as vitamin particles 200 are ingested by animal 50. Vitamin particles 200 are ingested by animal 50 while animal 50 chews and eats any portion of or all of second embodiment animal chew 190. Therefore, use of second embodiment animal chew 190 serves at least three purposes simultaneously. In this regard, second embodiment animal chew 190 provides (1) vitamin therapy, (2) cleans laniaries 20 and (3) massages gum tissue 30.

Figure 13:
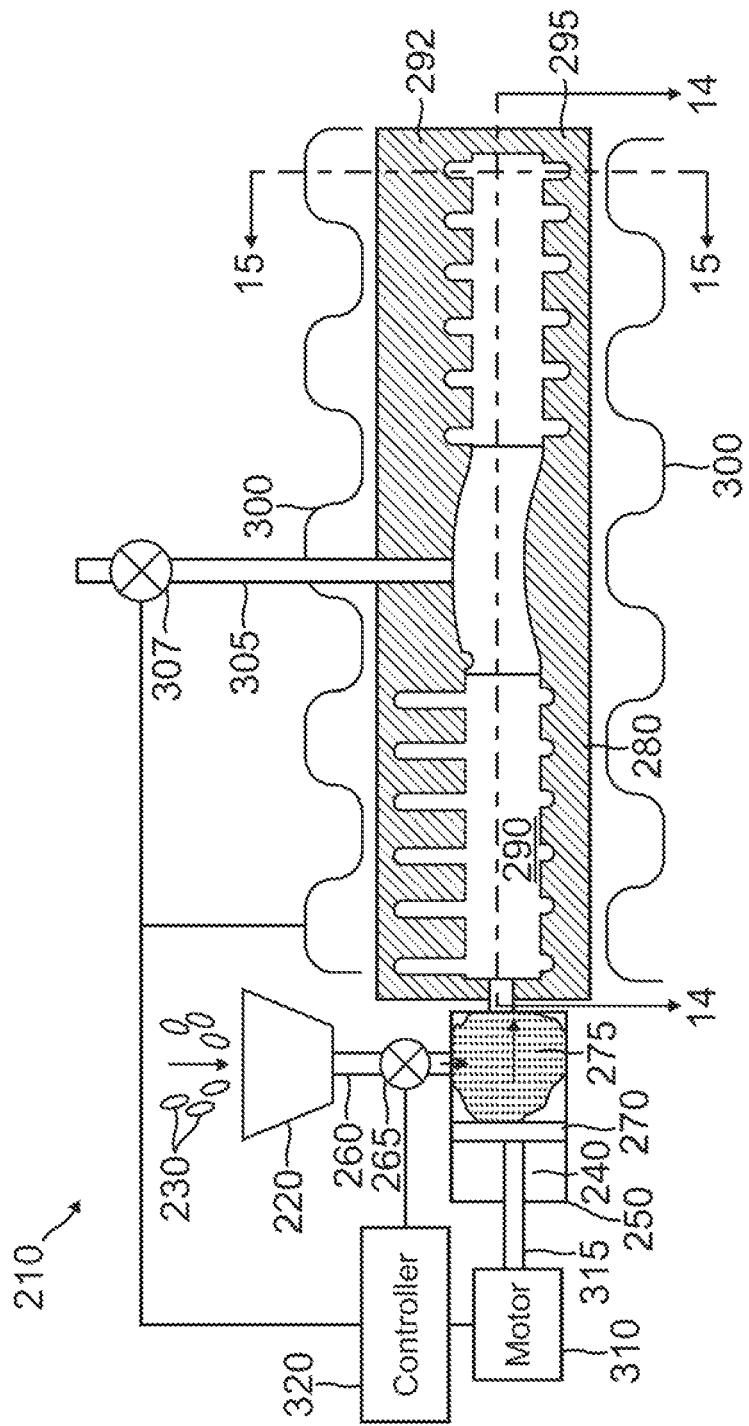
FIG. 13 is an illustration, with parts removed for clarity, of an injection mold system for manufacturing either the first embodiment or the second embodiment edible animal chew, the system including an injection mold for forming the edible animal chew into a predetermined shape.
Figure 14:
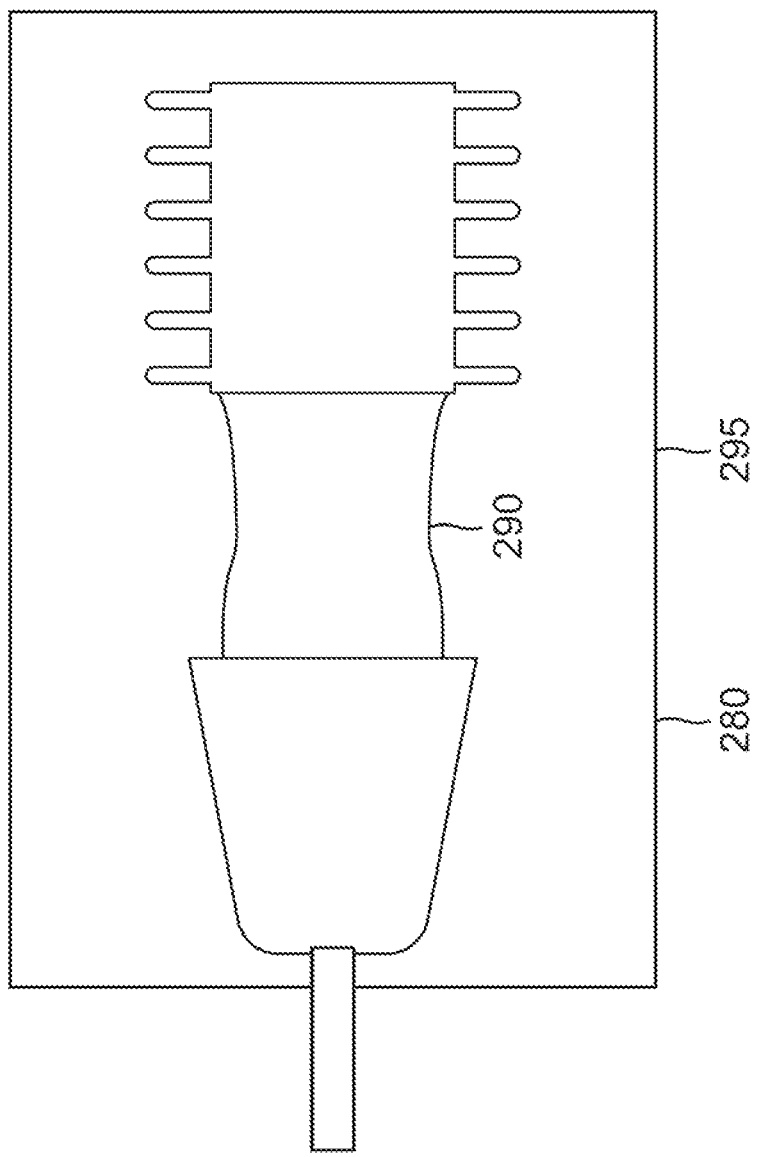
FIG. 14 is a view taken along section line 14-14 of FIG. 13.
Figure 15:
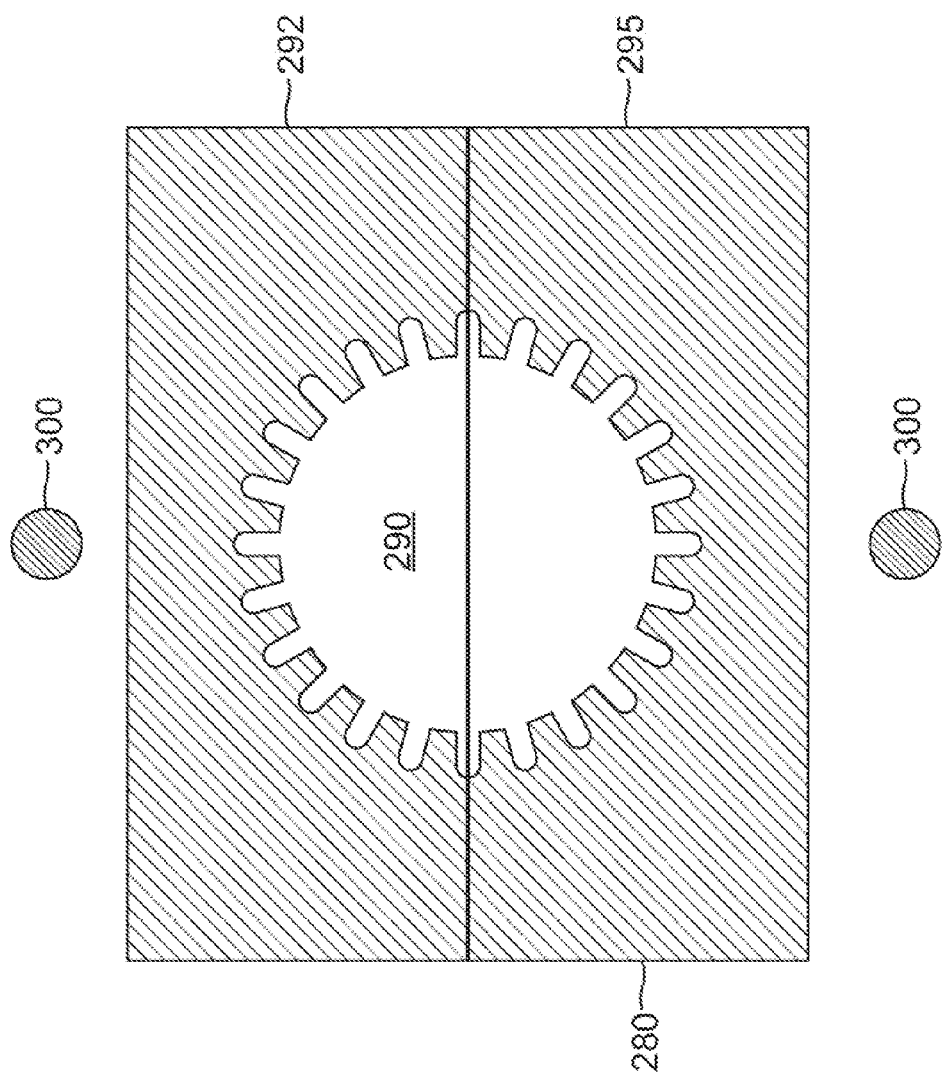
FIG. 15 is a view taken along section line 15-15 of FIG. 13.

Referring to FIGS. 13, 14 and 15, there is shown an injection mold system, generally referred to as 210, for manufacturing either first embodiment edible animal chew 10 or second embodiment animal chew 190 by means of an injection mold process. System 210 will be described with respect to manufacturing first embodiment edible animal chew 10, it being understood that use of system 210 applies to manufacture of second embodiment animal chew 190, as well. System 210 comprises a hopper 220 into which edible composition 180, in the form of a multiplicity of animal food pellets 230, is fed. Pellets 230 travel into a piston chamber 240 defined by a piston housing 250. Pellets 230 travels into piston chamber 240 by means of a conduit 260 interconnecting piston chamber 240 and hopper 220. Hopper 220 and conduit 260 may be substantially vertically oriented, so that pellets 230 travel down conduit 260 by force of gravity and without necessity of costly mechanical movement means, such as a conveyor belt apparatus. A valve 265 that may be motor operated, such as a motor operated check valve, is connected to conduit 260 for controlling amount and speed of pellets 230 as pellets 230 travel into piston chamber 240. A piston 270 is matingly disposed in piston chamber 240 and is controllably operated to compress pellets 230 into a plasticized compact body 275 and to push compact body 275 into a mold 280 by controlled translation of piston 270.

Referring again to FIGS. 13, 14 and 15, mold 280 defines a cavity 290 therein having the desired shape of first embodiment edible animal chew 10. In addition, mold 280 is bifurcated into a first section 292 mateably mountable onto an oppositely disposed second section 295 for reasons described hereinbelow. Mold 280 and thus first section 292 and second section 295 may be made of any suitable heat conductive material, such as aluminum, stainless steel or a ceramic material. Compact body 275 is flowable due, in part, to the previously mentioned moisture content and fat content of edible composition 180 that comprises compact body 275. Therefore, as piston 270 pushes compact body 275 through piston chamber 240, edible composition 180 comprising compact body 275 plastically flows into cavity 290 to substantially fill cavity 290. At least one heater element 300 is disposed sufficiently near mold 280 to heat mold 280 and thereby bake edible composition 180. Heater element 300 may be an electric resistance heater element. Alternatively, heater element 300 may be natural gas flame heater element. As another alternative, heater element 300 may be a microwave energy generator heater element. If desired, a vent 305 in open communication with cavity 280 and the surrounding atmosphere may be provided for escape of a predetermined amount of the moisture baked from edible composition 180. Controlling moisture content of edible composition 180 controls the hardness of edible composition 180. Controlling the hardness of edible composition 180, in turn, controls cleaning effectiveness of first embodiment edible animal chew 10. In order to control escape of moisture from edible composition 180, vent 305 may include a vent control valve 307, such as a one-way check valve. Edible composition 180 is baked a predetermined amount of time in order to harden edible composition 180 to a desired consistency. By way of example only, and not by way of limitation, edible composition 180 may be baked at a temperature of about 350 degrees Fahrenheit for about 15 minutes to about 20 minutes. However, the amount of time and heat input required to properly bake edible composition 180 depends on the types of ingredients and/or vitamins present in edible composition 180 and can be determined by a person of ordinary skill in the art without undue experimentation.

Referring again to FIGS. 13, 14 and 15, translation of piston 270 in cavity 290 is achieved by controlled operation of a motor 310 connected to piston 270, such as by means of a piston shaft 315. Motor 310 may be a variable speed motor for varying translation speed of piston 270 depending on plasticity of compact body 275. Plasticity of compact body 275 will vary depending on the ingredients and moisture content comprising compact body 275. A controller 320 is connected to motor 310 for controllably operating motor 310. Controller 320 is also connected to heater element 300 and valve 265 for controllably operating heater element 300 and valve 265. In addition, controller 320 is connected to vent control valve 307 for controllably operating vent control valve 307.

Still referring to FIGS. 13, 14 and 15, after edible composition 180, which comprises first embodiment edible animal chew 10, sufficiently hardens due to the baking process, first section 292 of mold 280 is removed from second section 295 and first embodiment edible animal chew 10 is retrieved from mold 280 by mechanical (not shown) or manual means and allowed to cool. Thereafter, first embodiment animal chew is either packaged and shipped to a customer or placed into inventory for later shipment.

Illustrative Methods:

An illustrative method associated with an exemplary embodiment for using an edible animal chew will now be described.

Figure 16:
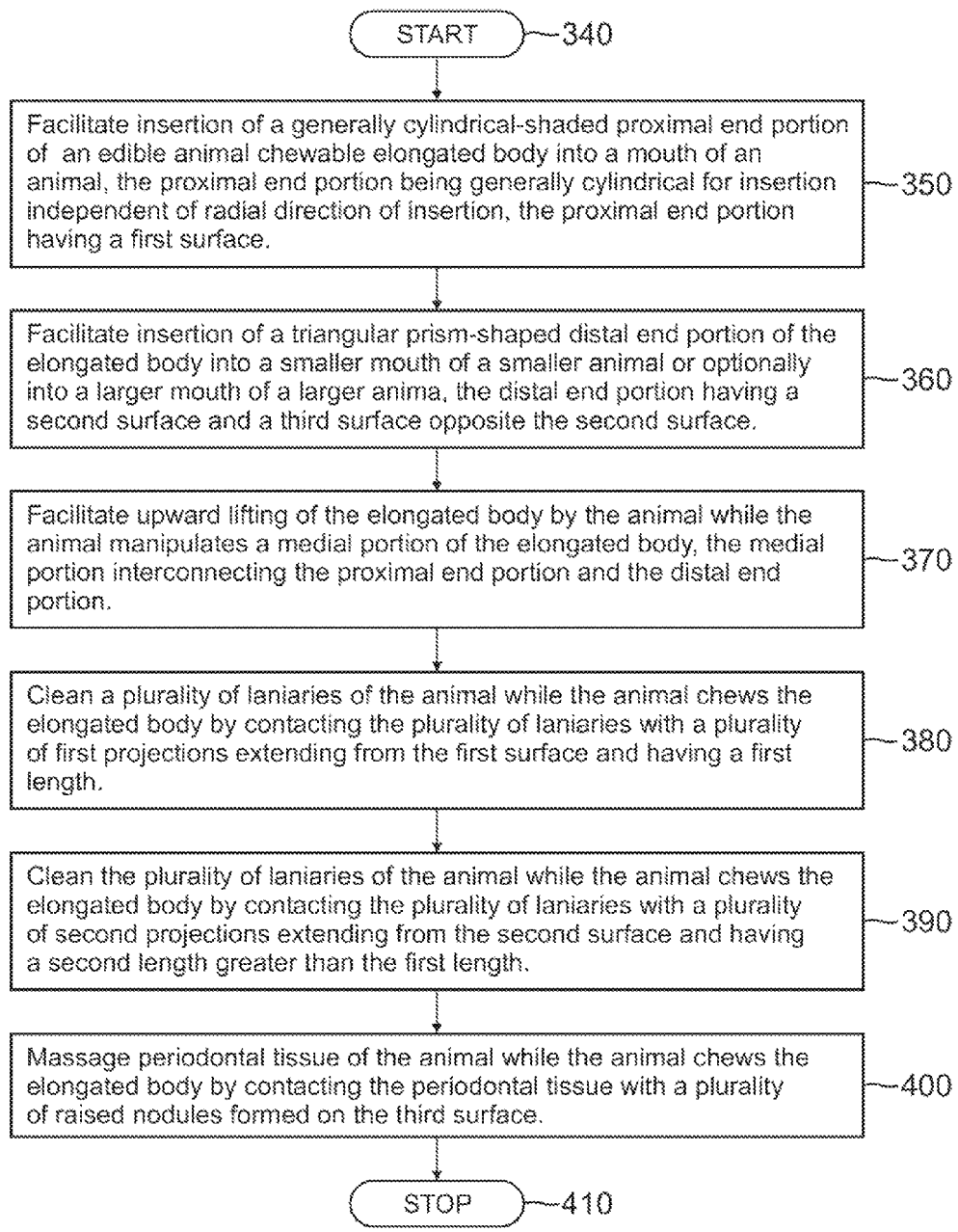
FIG. 16 is a flowchart showing an illustrative method of using the edible animal chew.

Referring to FIG. 16, an illustrative method, generally referred to as 330 that is provided for using an edible animal chew starts at a step 340. At a step 350, insertion of a generally cylindrical-shaped proximal end portion of an edible animal chewable elongated body into a mouth of an animal is facilitated, the proximal end portion being generally cylindrical for insertion independent of radial direction of insertion, the proximal end portion having a first surface. At a step 360, insertion of a triangular prism-shaped distal end portion of the elongated body into a smaller mouth of a smaller animal or optionally into a larger mouth of a larger animal is facilitated, the distal end portion having a second surface and a third surface opposite the second surface. At a step 370, upward lifting of the elongated body by the animal while the animal manipulates a medial portion of the elongated body is facilitated, the medial portion interconnecting the proximal end portion and the distal end portion. At a step 380, a plurality of laniaries of the animal is cleaned while the animal chews the elongated body by contacting the plurality of laniaries with a plurality of first projections extending from the first surface and having a first length. At a step 390, the plurality of laniaries of the animal is cleaned while the animal chews the elongated body by contacting the plurality of laniaries with a plurality of second projections extending from the second surface and having a second length greater than the first length. At a step 400, periodontal tissue of the animal is massaged while the animal chews the elongated body by contacting the periodontal tissue with a plurality of raised nodules formed on the third surface. The method stops at a step 410.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicants reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in the written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. The patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. For example, an embodiment of the edible animal chew is described hereinabove as having a plurality of vitamin particles distributed therein. However, rather than distributed vitamin particles, there alternatively could be a unitary or single core of vitamin material extending centrally, longitudinally through elongate body 60 along axis 92 for accomplishing vitamin therapy for animal 50. As another example, the embodiments of the animal chew are described hereinabove as being manufactured by an injection mold system. However, the embodiments of the animal chew described hereinabove may also be manufactured by an extrusion mold system instead. Accordingly, the description hereinabove is not intended to limit the invention, except as indicated in the following claims.

Therefore, provided herein are an edible animal chew and a method of using the same.

What is claimed is:

1. An edible animal chew for cleaning the laniaries and gum tissue of an animal, comprising:
    an elongated body member having a distal end portion, a proximal end portion and a medial portion; said medial portion being disposed between and integrally connected to said distal end portion and said proximal end portion, said distal end portion, said proximal end portion and said medial portion being configured asymmetrically about a longitudinal center axis defined by said elongated body member so that the animal can easily manipulate said elongated body member in order to insert said elongated body member into the mouth of the animal at any one of the portions;
    wherein said distal end portion is polyhedron-shaped defining a tapered shaped triangular prism having a first end portion of a first predetermined width and a second end portion opposite the first end portion, said second end portion having a second predetermined width substantially less than said first determined width for defining the tapered shape triangular prism distal end portion;
    said distal end taper shaped triangular prism being configured to provide an animal chewing area with a reduced risk of chocking when consumed and to further provide a longer chewing time to facilitate thoroughly cleaning of the laniaries and gum tissue of the animal during the longer chewing time;
    wherein said distal end portion is further provided with a planar second surface and a planar third surface opposite said planar second surface, said planar second surface having a plurality of outwardly perpendicular extending second projections disposed in a predetermined pattern on said planar second surface, said second projections being dimensioned to be insertable into the mouth of the animal so that said second projections intimately contact and scrape the laniaries and gum tissue of the animal to further facilitate thoroughly cleaning the laniaries and gum tissue of the animal during the longer chewing time;
    wherein said proximal end portion defines an elongated shaped cylinder having a circumferential first surface with a plurality of outwardly perpendicular extending first projections disposed in a predetermined pattern extending around the entire said first surface, said first projections being dimensioned to he insertable into the mouth of the animal so that the first projections intimately contact and scrape the laniaries and gum tissue of the animal to facilitate a thorough cleaning thereof during consumption of said elongated shaped cylinder by the animal;
    wherein said medial portion is an elongated curvilinear-shape defining an arch-shaped configuration to facilitate upward lifting of said elongated body member by the animal from an animal chew supporting surface regardless of the orientation of said elongated body member on said supporting surface; and
    a plurality of raised nodules extending perpendicularly upwardly from said third surface for massaging the gum tissue, said raised nodules being disposed in a predetermined pattern on said third surface.

2. The edible animal chew according to claim 1, wherein said proximal end portion and said first projections are sized to be insertable into the mouth of an animal so that said first projections intimately contact and scrape the laniaries and gum tissue of the animal to facilitate thoroughly cleaning the laniaries and gum tissue as said proximal end is being eaten by the animal.

3. The edible animal chew according to claim 2, wherein said first projections are conically shaped with a widest dimension thereof integrally connected to said first surface.

4. The edible animal chew according to claim 3, wherein said second projections on said second surface are generally conically-shaped with a widest dimension thereof integrally connected to said second surface.

5. The edible animal chew of claim 4, wherein said elongated body comprises an edible composition, selected from a group consisting essentially of a protein, a fat, a fiber and combinations thereof.

6. The edible animal chew according to claim 2, wherein said first projection are cylindrically-shaped; and
    wherein said cylindrically-shaped first projections have rounded edges to scrape the laniaries of the animal.

7. The edible animal chew according to claim 6, wherein said second projections on said second surface are cylindrically-shaped having rounded ends to enhance cleaning effectiveness of the laniaries by more efficiently scraping food particles and plaque from the laniaries and gum tissue of the animal.

8. The edible animal chew according to claim 2, wherein said first projections have an overall width and length for engaging and cleaning the laniaries of the animal; and
    wherein said overall width and length is determined by the size of the animal that will be presented with the edible animal chew for teeth cleaning purposes.

9. The edible animal chew according to claim 8, wherein the raised nodule pattern is a uniform pattern.

10. The edible animal chew of claim 9, wherein said edible composition comprises a natural vitamin.

11. The edible animal chew according to claim 8, wherein the raised nodule pattern is a random pattern.

12. The edible animal chew according to claim 8, wherein each individual nodule has a generally convex contour for intimate contact with gum tissue of the animal while any part of said distal end portion resides in the mouth of animal.

13. The edible animal chew according to claim 8, wherein each individual nodule has an overall length and width sufficient to remove plaque and food debris from the gum tissue as the nodules massage the animal gum tissue to help facilitate a reduced risk of periodontal disease developing in the gum tissue.

14. The edible animal chew according to claim 13, wherein said arch-shaped medial portion is provided with an undulating contour to further facilitate upward lifting by the animal from a chew supporting surface regardless of orientation of the edible animal chew on the chew supporting surface.

15. The edible animal chew according to claim 2, wherein said second projections have a greater predetermined overall width and length than the predetermined overall width and length of said first projections for cleaning larger size laniaries of a large animal.

16. The edible animal chew according to claim 15, wherein said medial portion is scored at a location adjacent to said distal end portion for providing a fracture region of reduced thickness to facilitate the easy separation of said distal end portion from said medial portion to allow the animal to consume either said distal end portion or optionally the combination of said medial portion and said proximal end portion.

17. The edible animal chew according to claim 16, wherein said medial portion is further scored at a location adjacent to said proximal end portion for providing another fracture region of reduced thickness to facilitate the easy separation of said proximal end portion from said medial portion to allow the animal to consume either said medial portion or optionally said proximal end portion for management of a meal portion fed to the animal.

18. The edible animal chew according to claim 1, wherein said elongated body member is sized to be received in the mouth of an animal selected from a group of animals consisting of small sized animals, medium sized animals, and large sized animals.

19. An edible animal chew for cleaning the laniaries and gum tissue of an animal, comprising:
- an elongated body member having a proximal end portion defining an elongated shaped cylinder having a circumferential first surface with a plurality of outwardly perpendicular extending first projections disposed in a predetermined pattern extending around the entire said first surface, said first projections being dimensioned to be insertable into the mouth of the animal so that the first projections intimately contact and scrape the laniaries and gum tissue of the animal to facilitate a thorough cleaning thereof during consumption of said elongated shaped cylinder by the animal;
- said elongated body member further having a polyhedron-shaped distal end portion defining a tapered shaped triangular prism having a first end portion of a first predetermined width and a second end portion opposite the first end portion, said second end portion having a second predetermined width substantially less than said first determined width for defining the tapered shaped triangular prism distal end portion;
- said distal end taper shaped triangular prism being configured to provide an animal chewing area with a reduced risk of chocking when consumed and to further provide a longer chewing time to facilitate thoroughly cleaning the laniaries and gum tissue of an animal during said longer chewing time;
- wherein said distal end portion is further provided with a planar second surface and a planar third surface opposite said planar second surface, said planar second surface having a plurality of outwardly perpendicular extending second projections disposed in a predetermined pattern on said second surface, said second projections being dimensioned to be insertable into the mouth of the animal so that the second projections intimately contact and scrape the laniaries and gum tissue of the animal to further facilitate thoroughly cleaning the laniaries and gum tissue of the animal during said longer chewing time;
- said elongated body member still further having an elongated curvilinear-shaped medial portion, defining an arch-shaped configuration to facilitate upward lifting of said elongated body member by the animal from an animal chew supporting surface regardless of the orientation of said elongated body member on said supporting surface;
- said elongated medial portion being disposed between and integrally connected to said proximal end portion and said distal end portion, said proximal end portion, said distal end portion being configured as a single, one-piece construction asymmetrically about a longitudinal center axis defined by said elongated body member so that the animal can easily manipulate said elongated body member in order to insert said elongated body member into the mouth of the animal at any one of the portions; and
- a plurality of raised nodules extending perpendicularly upwardly from said third surface for massaging the gum tissue, said raised nodules being disposed in a predetermined pattern on said third surface.

20. An edible animal chew for cleaning the laniaries and gum tissue of an animal, comprising:
- an elongated undulating arched-shaped medial portion integrally attached at one of its ends to a first elongated teeth cleaning member and integrally attached at another one of its end to a second elongated teeth cleaning member;
- said elongated undulating shaped medial portion being sufficiently raised above a ground supporting surface relative to said first elongated teeth cleaning member and said second elongated teeth cleaning member to facilitate the upward lifting of the edible animal chew from said ground surface regardless of the orientation of said elongated body member on said supporting surface;
- said first elongated teeth cleaning member being configured in a triangular prism shape to provide an animal chewing area with a reduced risk of chocking when consumed and to further provide a longer chewing time to facilitate thoroughly cleaning the laniaries and gum tissue of an animal during said longer chewing time;
- said first elongated teeth cleaning member having a top side teeth cleaning surface area with a plurality of perpendicularly upwardly extending teeth and gum engaging members and a bottom side gum massaging surface area with a plurality of perpendicularly upwardly extending gum massaging members; and said second elongated teeth cleaning member being configured in an elongated cylinder shape having a circumferential teeth cleaning surface with a plurality of outwardly perpendicular extending projections disposed in a predetermined pattern extending around the entire teeth cleaning surface, said projections being dimensioned to be insertable into the mouth of the animal so that the projections intimately contact and scrape the laniaries and gum tissue of the animal to facilitate a thorough cleaning thereof during consumption of said second elongated teeth cleaning member; and said first elongated teeth cleaning member and said second elongated teeth cleaning member being separable from said elongated undulating arched-shaped medial portion to facilitate providing the animal with different meal portions during feeding times, said first elongated teeth cleaning member, said second elongated teeth cleaning member, and said elongated undulating shaped medial portion being configured asymmetrically about a longitudinal center axis defined by said first elongated teeth cleaning member, said second elongated teeth cleaning member, and said elongated undulating shaped medial portion so that the animal can easily manipulate said first elongated teeth cleaning member, said second elongated teeth cleaning member, and said elongated undulating shaped medial portion.

* * * * *